(12) United States Patent
Patel et al.

(10) Patent No.: US 8,688,540 B1
(45) Date of Patent: Apr. 1, 2014

(54) SYSTEM AND METHOD FOR FULFILLMENT SERVICES COORDINATION

(75) Inventors: Ankit Patel, Seattle, WA (US); Adam J. Kramer, Seattle, WA (US); Joanne J M Polsky, Seattle, WA (US); Nancy L. Walsh, Issaquah, WA (US); Kyle A. Freeman, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1077 days.

(21) Appl. No.: 12/037,707

(22) Filed: Feb. 26, 2008

(51) Int. Cl.
*G06Q 30/00* (2012.01)

(52) U.S. Cl.
USPC .................................. 705/26.3; 705/26.1

(58) Field of Classification Search
USPC .................................. 705/26.1, 26.3, 27.1
See application file for complete search history.

(56) References Cited

U.S. PATENT DOCUMENTS

| | | | |
|---|---|---|---|
| 5,715,314 | A | 2/1998 | Payne et al. |
| 5,909,492 | A | 6/1999 | Payne et al. |
| 5,960,411 | A | 9/1999 | Hartman et al. |
| 6,029,141 | A | 2/2000 | Bezos et al. |
| 6,101,482 | A | 8/2000 | DiAngelo et al. |
| 6,223,215 | B1 | 4/2001 | Hunt et al. |
| 6,405,176 | B1 | 6/2002 | Toohey |
| 6,449,599 | B1 | 9/2002 | Payne et al. |
| 6,587,827 | B1 | 7/2003 | Hennig et al. |
| 6,622,127 | B1 | 9/2003 | Kiots et al. |
| 6,725,222 | B1 | 4/2004 | Musgrove et al. |
| 6,845,364 | B1 | 1/2005 | Pool et al. |
| 6,873,968 | B2 | 3/2005 | Ehrlich et al. |
| 7,050,938 | B1 | 5/2006 | Prater et al. |
| 7,222,087 | B1 | 5/2007 | Bezos et al. |
| 7,370,009 | B1 | 5/2008 | Notani et al. |
| 7,406,472 | B2 | 7/2008 | Manucha et al. |
| 2002/0138496 | A1 | 9/2002 | Schambach et al. |
| 2002/0178074 | A1 | 11/2002 | Bloom |
| 2003/0033205 | A1 | 2/2003 | Nowers et al. |
| 2003/0069831 | A1 | 4/2003 | Le et al. |
| 2003/0083949 | A1 | 5/2003 | Kar |
| 2003/0115072 | A1 | 6/2003 | Manucha et al. |
| 2003/0171962 | A1 | 9/2003 | Hirth et al. |
| 2003/0172007 | A1 | 9/2003 | Helmolt et al. |
| 2004/0064351 | A1 | 4/2004 | Mikurak |

(Continued)

OTHER PUBLICATIONS

Hyland, T, "Virtual firm just a freight forwarder at heart," Transportation & Distribution, May 2001, 42.5, 12DC-16DC.*

(Continued)

*Primary Examiner* — Brandy A Zukanovich
(74) *Attorney, Agent, or Firm* — Robert C. Kowert; Meyertons, Hood, Kivlin, Kowert & Goetzel, P.C.

(57) ABSTRACT

Various embodiments of the system and method for managing sales and fulfillment services described herein may include a fulfillment coordination service. The fulfillment coordination service may be configured to receive a selection of one or more items of a merchant. The one or more items may be registered for fulfillment service with a fulfillment service provider. The fulfillment coordination service may also be configured to generate a sales listing for each selected item for listing with a sales listing provider. The fulfillment coordination service may in various embodiments receive an order indication for one or more of the selected items listed on the sales listing. The fulfillment coordination service may be configured to send a fulfillment request to the fulfillment service provider for the one or more items indicated by the order indication.

33 Claims, 13 Drawing Sheets

(56) References Cited

U.S. PATENT DOCUMENTS

| | | |
|---|---|---|
| 2004/0111286 A1 | 6/2004 | Koenig et al. |
| 2004/0117337 A1 | 6/2004 | Beck et al. |
| 2004/0254842 A1 | 12/2004 | Kirkegaard |
| 2005/0006456 A1 | 1/2005 | White |
| 2005/0033671 A1 | 2/2005 | Hahn-Carlson |
| 2005/0081151 A1 | 4/2005 | Van Der Meer |
| 2005/0114222 A1 | 5/2005 | Mundy |
| 2005/0125312 A1 | 6/2005 | Dearing et al. |
| 2005/0154904 A1 | 7/2005 | Perepa et al. |
| 2006/0036504 A1 | 2/2006 | Allocca et al. |
| 2006/0089897 A1 | 4/2006 | Maas et al. |
| 2006/0116936 A1 | 6/2006 | Lucas |
| 2006/0122892 A1 | 6/2006 | Fletcher et al. |
| 2006/0122897 A1 | 6/2006 | Fletcher et al. |
| 2006/0190362 A1 | 8/2006 | Krystek et al. |
| 2006/0195364 A1 | 8/2006 | Shroff et al. |
| 2007/0078725 A1 | 4/2007 | Koszewski et al. |
| 2007/0094510 A1 | 4/2007 | Ross et al. |
| 2007/0143206 A1 | 6/2007 | Cui et al. |
| 2007/0192215 A1* | 8/2007 | Taylor et al. .................... 705/28 |

OTHER PUBLICATIONS

Cohen, "Electronic Commerce," Information Sciences Institute Research Report ISI/RR-89-244, Oct. 1989, 46 pages.
Amazon Advantage Membership Agreement, Instructions & Rules, Dec. 6, 2004, downloaded from web.archive.org/web/20041211005149/www.amazon.com/exec/obidos/subst/partners/direct/direct-agreement.html, 9 pages.
Amazon Advantage Overview, downloaded from web.archive.org/web/20041024162213/http://www.amazon.com/exec/obidos/subst/partners/direct/advantage/homt.html/, 2 pages.
Amazon.com Press Release, "Target and Amazon.com team to advance e-commerce initiatives," Sep. 11, 2001, 2 pages.
Amazon.com Press Release, "Target to deliver four unique brands in one comprehensive site at target.com," Aug. 12, 2002, 2 pages.
U.S. Appl. No. 11/852,040, filed Sep. 7, 2007.
U.S. Appl. No. 11/351,881, filed Feb. 10, 2006.
U.S. Appl. No. 11/958,852, filed Dec. 18, 2007.
U.S. Appl. No. 11/756,160 filed May 31, 2007.
U.S. Appl. No. 11/751,433, filed May 21, 2007.

* cited by examiner

Provide authentication information for your service providers:

sales listing service provider:
- username 1121
- password 1122
- other authentication data 1123 payment service provider:
- username 1131
- password 1132
- other authentication data 1133 fulfillment service provider:
- username 1141
- password 1142
- other authentication data 1143 other service provider:
- username 1151
- password 1152
- other authentication data 1153 submit 1170 authentication information submission display 1100A

*FIG. 11A*

Select inventory item(s) for which sales listing will be generated:

☒ inventory item 1175A
☐ inventory item 1175B
☒ inventory item 1175C
⋮
☐ inventory item 1175N submit 1180          inventory selection display 1100B

FIG. 11B

Modify your sales listing (if necessary):

generated content 1185 merchant-supplied content 1190 preview 1191    submit 1192    cancel 1193 sales listing generation display 1100C

FIG. 11C

SYSTEM AND METHOD FOR FULFILLMENT SERVICES COORDINATION

BACKGROUND

In order to offer customers a variety of items readily available for delivery, many merchants (whether engaging in electronic or conventional "brick and mortar" commerce) hold various quantities of such items within inventory facilities. Keeping items in inventory may serve to buffer variations in customer demand or a manufacturer or distributor's ability to supply various items. For example, different items offered for sale by a merchant may have different manufacturer lead times. Holding quantities of such items as inventory may enable a merchant to offer consistent availability of these items to customers despite the different lead times.

However, in some circumstances, holding inventory may present various costs or disadvantages to a merchant. For example, inventory storage facilities may be expensive to provision and maintain, particularly for smaller merchants who may not be able to efficiently and profitably distribute the fixed costs of such facilities across a limited quantity of inventory. Moreover, should the need arise, scaling an inventory system to accommodate increased demand or volume may be an expensive proposition requiring substantial investment in technology, facilities and/or staffing. As electronic commerce grows in popularity, many merchants increasingly list their offerings along with other merchants via electronic marketplaces that provide a common interface through which customers may search for items and place orders. In many cases, such electronic marketplaces include information about the products sold via the listings of the marketplace.

BRIEF DESCRIPTION OF THE DRAWINGS

FIG. 11A illustrates an exemplary authentication information submission display that may be generated by a fulfillment coordination service, according to various embodiments.

FIG. 11B illustrates an exemplary inventory selection display that may be generated by a fulfillment coordination service, according to various embodiments.

FIG. 11C illustrates an exemplary sales listing generation display that may be generated by a fulfillment coordination service, according to various embodiments.

While the system and method for managing sales and fulfillment services is described herein by way of example for several embodiments and illustrative drawings, those skilled in the art will recognize that the system and method for managing sales and fulfillment services is not limited to the embodiments or drawings described. It should be understood, that the drawings and detailed description thereto are not intended to limit embodiments to the particular form disclosed. The intention is to cover all modifications, equivalents and alternatives falling within the spirit and scope of the system and method for managing sales and fulfillment services as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for managing sales and fulfillment services are described. The system and method for managing sales and fulfillment services may include a fulfillment coordination service configured to coordinate the interaction of multiple services providers associated with the sale and/or fulfillment of one or more items. For instance, in various embodiments, the fulfillment coordination service may be configured to, among other things, communicate with merchants to generate sales listings from item description information, receive purchase notifications that indicate the sale of one or more items via such sales listings, and communicate with fulfillment services provider(s) to complete the fulfillment of such items. In some embodiments, the fulfillment coordination service may be configured to communicate with one or more payment service providers. For instance, the fulfillment coordination service may be configured to receive from a payment service provider a payment confirmation notification that indicates a customer has provided payment for one or more items sold via the generated sales listings.

Figure 1:
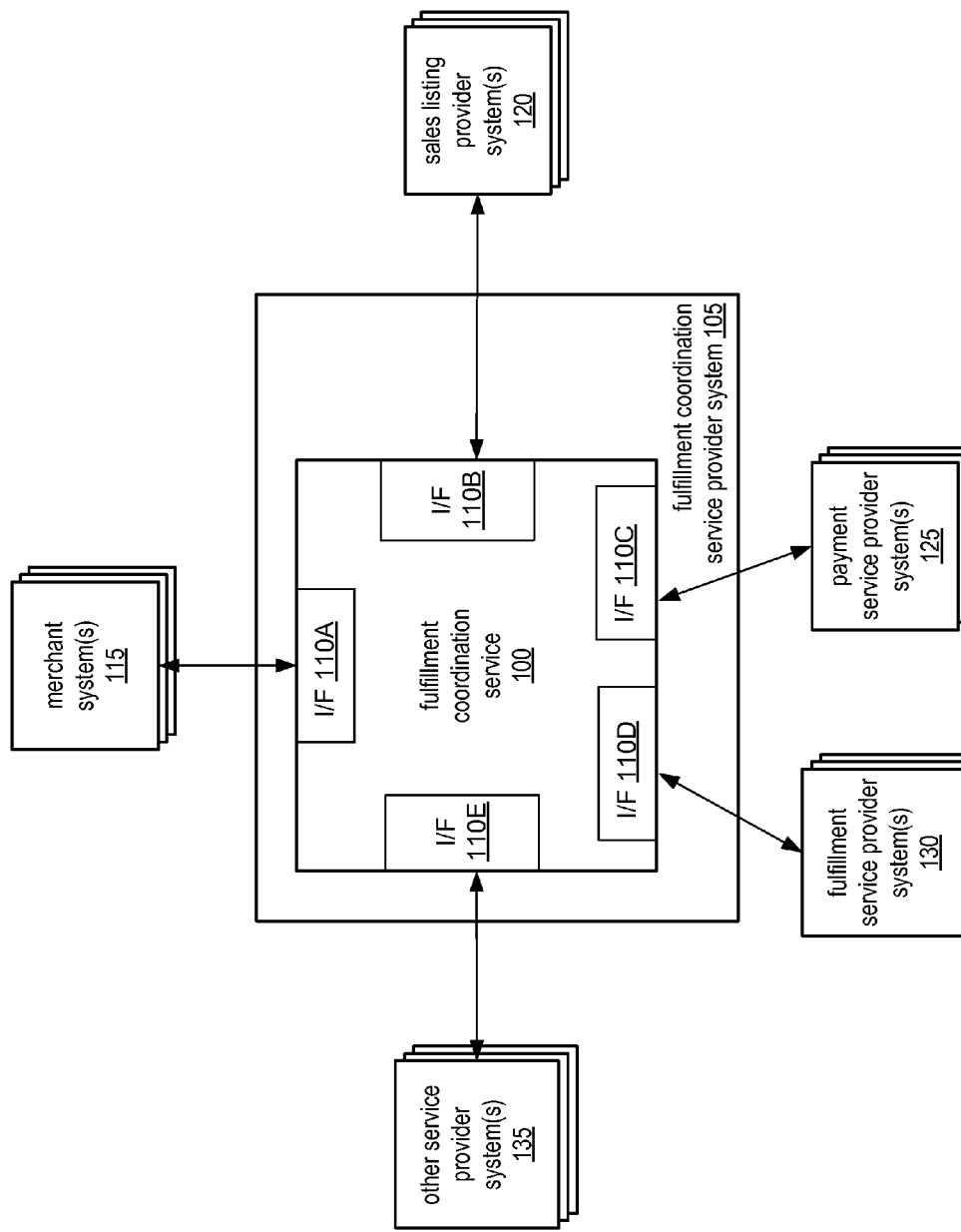
FIG. 1 illustrates a block diagram of a system including a fulfillment coordination service of a fulfillment coordination service provider, according to various embodiments.

FIG. 1 illustrates a fulfillment coordination service, such as fulfillment coordination service 100 of fulfillment coordination service provider system 105, according to some embodiments. In the illustrated embodiment, fulfillment coordination service 100 may communicate with one or more merchants, such as one or more merchants controlling merchant system(s) 115. The fulfillment coordination service may also communicate with one or more service providers, such as one or more sales listing providers controlling sales listings provider system(s) 120, one or more payment service providers controlling payment service provider system(s) 125, one or more fulfillment service providers controlling fulfillment service provider system(s) 130, and/or other service providers controlling system(s) 135. The fulfillment coordination service may be configured to communicate with each illustrated system via one or more computer networks, such as Local Area Networks (LANs) (e.g., corporate or Ethernet networks), Wide Area Networks (WANs) (e.g., the Internet), and/or some combination thereof. As demonstrated by the illustrated embodiment, the fulfillment coordination service may include one or more interfaces (illustrated as I/F 110A-110E) configured to communicate with each of the illustrated computer systems. In some embodiments, such interfaces may include one or more web service interfaces or Application Programming Interfaces (APIs) accessible over one or more networks. In various embodiments, systems 115-135 may also include one or more corresponding interfaces (e.g., web service interfaces, APIs, etc.) configured to communicate with fulfillment coordination service 100.

In various embodiments, each merchant controlling respective ones of merchant systems 115 may have one or more merchant accounts with various ones of the service providers controlling systems 120-135. In some embodiments, fulfillment coordination service 100 may be configured to receive merchant authentication information from one or more merchants controlling various ones of merchant systems 115. For instance, merchants may use various ones of merchant systems 115 to provide usernames, passwords, pass codes, security codes, Personal Identification Numbers (PINs), authentication tokens, and/or other authentication information to fulfillment coordination service 100. Such authentication information may enable the fulfillment coordination service to access the various service provider systems on behalf of the user. In some cases, such authentication information may be the same authentication information used by a merchant to access each service provider system independent of the fulfillment coordination service.

In various embodiments, each of the merchants controlling ones of merchant systems 115 may have one or more items for sale (e.g., inventory). Each merchant's inventory may be stored in various locations. In some embodiments, the merchant may be responsible for storing and managing such inventory. In other embodiments (as described in more detail below with respect to fulfillment services providers), the merchants inventory may be stored and/or managed by other commercial entities (e.g., a fulfillment service provider). In various embodiments, fulfillment coordination service 100 may be configured to track and record (e.g., in a database or other data store) the status and/or inventory level of such inventory irrespective of the inventory's location. In this manner, the fulfillment coordination service may provide a single location from which a merchant may manage their inventory (even if such inventory is located in disparate locations and/or managed by disparate commercial entities). For instance, in one embodiment, some of a merchant's inventory is managed by the merchant while other portions of the merchant's inventory are managed by various ones of the fulfillment service providers that control fulfillment service provider systems 130. In this example, fulfillment coordination service 100 may enable the merchant to view and/or manage all of such inventory via a user interface provided by interface 110A.

In various embodiments, the fulfillment coordination service may be configured to provide a real-time or near real-time view of a merchant's inventory (e.g., a listing of such inventory and corresponding inventory levels). For instance, changes in inventory levels of various items may be determined or detected by fulfillment coordination service 100 irrespective of where such items reside and/or which commercial entity manages such items. For example, one of sales listing provider system(s) 120 may provide (e.g., via interface 110B) to fulfillment coordination service 100 information that indicates a particular item of the merchant's inventory has been sold. Accordingly, fulfillment coordination service 100 may update its record of the merchant's inventory to reflect a reduction in the inventory level for the particular item sold. Similarly, a merchant may provide (e.g., via interface 110A) to fulfillment coordination service information that indicates an item has been added to the merchant's inventory. Accordingly, fulfillment coordination service 100 may update its record of the merchant's inventory to reflect an increase in the inventory level for the respective item.

As described above, fulfillment coordination service 100 may be configured to track and manage a merchant's inventory irrespective of which commercial entity manages such items. In some cases, such inventory may be existing inventory, such as inventory previously registered with and provided to each commercial entity (e.g., a fulfillment services provider. However, in various embodiments, the fulfillment coordination service may be configured to register new inventory items with one or more commercial entities. For instance, the fulfillment coordination service may enable a merchant to specify one or more items for fulfillment with various fulfillment service providers. For each specified item, the fulfillment coordination service may notify the respective fulfillment service provider of the new inventory. In various embodiments, the fulfillment coordination service may also generate shipping information (e.g., shipping labels) for the items to facilitate the shipment of such items from the merchant to the respective fulfillment services provider. In other cases, such as when the merchant utilizes a third party product supplier, the fulfillment coordination service may provide a notification to such supplier. Such notification may specify one or more inventory items to be shipped to a particular fulfillment services provider in order to facilitate the shipment of such items from the supplier to the fulfillment services provider (or other specified commercial entity).

In various embodiments, fulfillment coordination service 100 may generate one or more sales listings for one or more items of the merchant's inventory. For instance, in various embodiments, a merchant may provide (e.g., via interface 110A) to fulfillment coordination service 100 information that indicates one or more items for which sales listings should be generated. In some cases, such information may also indicate a particular sales listing provider that should host such generated sales listings (e.g., one or more of the sales listing providers that control sales listing provider systems 120). For example, for a particular item of the merchant's inventory, fulfillment coordination service 100 may generate a sales listing and provide such sales listing (e.g., the data that defines such sales listing) to one or more of sales listing provider systems 120 to be hosted. In other cases, one or more of sales listing provider systems(s) 120 may be responsive to one or more commands for generating sales listings. In such cases, fulfillment coordination service may send such commands to one or more of sales listing provider systems 120 in order to generate sales listings to hosted by systems 120. In some cases, the fulfillment coordination service may also provide to sales listing provider systems 120 item description information (described in more detail below) with such commands. One or more of sales listing provider systems 120 may use such commands and/or item description information to generate sales listings accessible to one or more customers. For instance, the sales listing provider systems may be configured to host such sales listings such that the sales listings are accessible via a network (e.g., the Internet). In such a case, customers may browse and/or purchase items via such sales listings.

In various embodiments, the sales listings generated by fulfillment coordination service may be generated based on item description information. In various embodiments, item description information may be stored and/or managed by the fulfillment coordination service. In some cases, some or all of the item description information may be stored and/or managed by one or more of service provider systems 120-135, such as one of fulfillment service provider systems 130. In such cases, the fulfillment coordination service may be configured to access item description information from any of such systems. In various embodiments, item description information may include keywords associated with various inventory items, text-based descriptions of various inventory items (e.g., a description of an item's features or a description of an item's physical appearance), prices for various inventory items, dimensions of various inventory items, weights for various inventory items, and/or images (and/or video or other multimedia) of various inventory items. In various embodiments, the item description information may have been obtained by the fulfillment coordination service from other commercial entities, such as item manufactures. In other cases, such item description information may be generated by the fulfillment coordination service or any of the illustrated service provider systems.

In various embodiments, the generated sales listings may be online auctions that enables customers to bid on (and win) one or more items listed for auction with one of sales listing provider systems 120. In other cases, instead of online auctions, the sales listings provided may be product web pages or other item listings accessible by one or more customers via a network. In various embodiments, it may be beneficial for a merchant to have a particular item(s) listed for sale in multiple locations (e.g., listed by multiple sales listing providers). For instance, in some cases, listing a particular item(s) for sale with multiple sales listing service providers may increase the particular item's exposure to customers and, in some cases, increase the chance that such item will be purchased.

In various embodiments, when an item is sold via the sales listings provided by various ones of sales listing provider systems 120, the respective sales listing provider system may provide fulfillment coordination service 100 with a notification that indicates such items have been sold. However, in other cases, the fulfillment coordination service may be configured to poll various ones of sales listing provider systems 120 to determine whether one or more items have sold. For instance, in one embodiment, one of sales listing provider systems 120 may be configured to offer an item for via an online auction. In such an embodiment, the fulfillment coordination service may be configured to poll the sales listing provider system at or near (e.g., slightly after) the time at which the particular auction is scheduled to end in order to determine if the item up for auction was purchased.

As described above, each of sales listing provider systems 120 may host sales listings (e.g., sales listing generated by fulfillment coordination service 100) such that the sales listings are accessible to one or more customers (e.g., via the Internet or another network). In some embodiments, one or more of sales listing provider systems 120 may be configured to process payments from customers for one or more of a merchant's items. In such embodiments, the fulfillment coordination service may be configured to receive a payment confirmation notification from the sales listing provider, such notification indicating that a particular item (or items) of the merchant's inventory has been sold. In this case, the fulfillment coordination service may update its inventory records and provide a fulfillment request to one or more of fulfillment service provider systems 130. Fulfillment services provider systems 130 may process such fulfillment request (described in more detail below).

In other embodiments, one or more of sales listing provider systems 120 may be configured to, for one or more items sold via the generated sales listings, rely on a payment service provider to process the payment for such items. For instance, when an item is purchased via the generated sales listings hosted by one or more of sales listing provider systems 120, such sales listing provider system(s) may provide a purchase notification to the fulfillment coordination service. Such notification may indicate that one or more particular items have been purchased as well as other information including but not limited to contact information for the purchaser (e.g., name, address, phone number, etc.) and payment information (e.g., order total, type of credit card, credit account number, bank account number, routing number, or other payment account information). The fulfillment coordination service may forward this notification to be processed by one or more of payment service provider systems 125. In some embodiments, one or more of sales listing provider systems 120 may directly provide (e.g., outside of fulfillment coordination service 100) such notification to a payment service provider system of payment service provider systems 125. Payment service provider's 125 may each be configured to process payments for one or more items sold via the generated sales listings described above. For instance, in response to the notifications described above, a payment service provider system may be configured to communicate with the respective customer to, e.g., obtain payment or payment authorization information. The payment service provider system may be configured to process the respective payment and provide the fulfillment coordination service a notification that indicates the items for which payment has been successfully processed.

In various embodiments, the fulfillment coordination service may generate an order fulfillment request for fulfillment of one or more items sold via the sales listings hosted by sales listing provider systems 120. Such fulfillment request may be generated based on a payment confirmation notification (described above) received from a sales listing provider system or a payment service provider system. One or more of such order fulfillment requests may be provided (e.g., via interface 110D) to ones of fulfillment service provider systems 130. Such order fulfillment requests may indicate one or more items (e.g., items sold via the sales listings hosted by the sales listing provider systems) to be packaged and/or shipped to customers that have purchased such items. The fulfillment service provider controlling the fulfillment service provider system that receives such an order fulfillment request may locate, package, and/or ship such items to the respective customer.

In various embodiments, for a particular order fulfillment request, the fulfillment coordination service may be configured to determine or select a particular fulfillment service provider to which to send the order fulfillment request for fulfillment. For instance, the fulfillment coordination service may determine the particular fulfillment provider system to which to provide the order fulfillment request based on the proximity of the fulfillment service provider to the destination address to which the items are shipped. In another example, the fulfillment coordination service may determine the particular fulfillment provider system to which to provide the order fulfillment request based on the inventory levels of the various fulfillment service providers. For instance, if a fulfillment service provider is out-of-stock of a particular item, that fulfillment service provider may not be considered for fulfillment of such item.

In various embodiments, fulfillment coordination service 100 may communicate with one or more other service provider systems 135. In some embodiments, other service provider systems 135 may include a customer service management system. For instance, in addition to an order fulfillment request for one or more particular items, the fulfillment coordination service may be configured to generate a customer service request and provide such request to the customer service provider system. Accordingly, the customer service provider may, for each item specified by the customer service request, perform a variety of services including but not limited to providing tracking services (e.g., tracking the shipped items in transit to ensure proper delivery), fielding customer calls regarding such items, and/or managing returns/exchanges for such items. In some embodiments, ones of other service provider systems 135 may be storage service systems controlled by a storage service provider. Fulfillment coordination service 100 may in various embodiments use such storage service systems for storage and/or retrieval of data, such as data related to item sales or order fulfillment. In some embodiments, ones of other service provider systems 135 may be a queuing service provider configured to queue one or more jobs related to item sales or order fulfillment.

Note that in various embodiments various ones of the entities that control each of the systems of FIG. 1 (e.g., items 105-135) may be different commercial entities or in some cases the same commercial entities, or some combination thereof. In general, the fulfillment coordination service may be controlled by a fulfillment coordination service provider and at least one of the other illustrated systems (e.g., at least one of items 115-135) is controlled by a separate or different commercial entity. In one embodiment described in more detail below, a commercial entity controlling the fulfillment coordination service and a commercial entity controlling various ones of fulfillment service provider systems 130 are the same commercial entity.

In some embodiments, the fulfillment coordination service may be implemented by a fulfillment services provider that provides fulfillment services to one or more merchants (e.g., the fulfillment service providers that control fulfillment service provider systems 130), such as described below with respect to FIGS. 2-6. For example, merchants may provide inventory (e.g., one or more items) to the fulfillment services provider. When such items are sold to a customer, the fulfillment services provider may provide fulfillment services (e.g., locating, packing, shipping, and/or other actions) for the items. In various embodiments, the fulfillment service provider may provide a database of item characteristics and other information related to the items for which the provider provides fulfillment services. The fulfillment services provider may leverage such information to generate sales listings on computer systems of entities other than the fulfillment services provider. In this way, different sales listings for a merchant's items may be located in multiple venues. For instance, a particular item may have a corresponding sales listing hosted by the fulfillment services provider. Additionally, the fulfillment coordination service described herein may generate another sales listing (e.g., a different type of sales listing, such as an auction) on a computer system of a commercial entity other than the fulfillment services provider. In some cases, such multiple sales listings for a single item may increase the exposure of the item to potential customers. Additional description of fulfillment services providers is provided by U.S. patent application Ser. No. 11/351,881 and U.S. patent application Ser. No. 11/756,160, which applications are hereby incorporated by reference in their entirety, including any appendices and references thereto.

Figure 2:
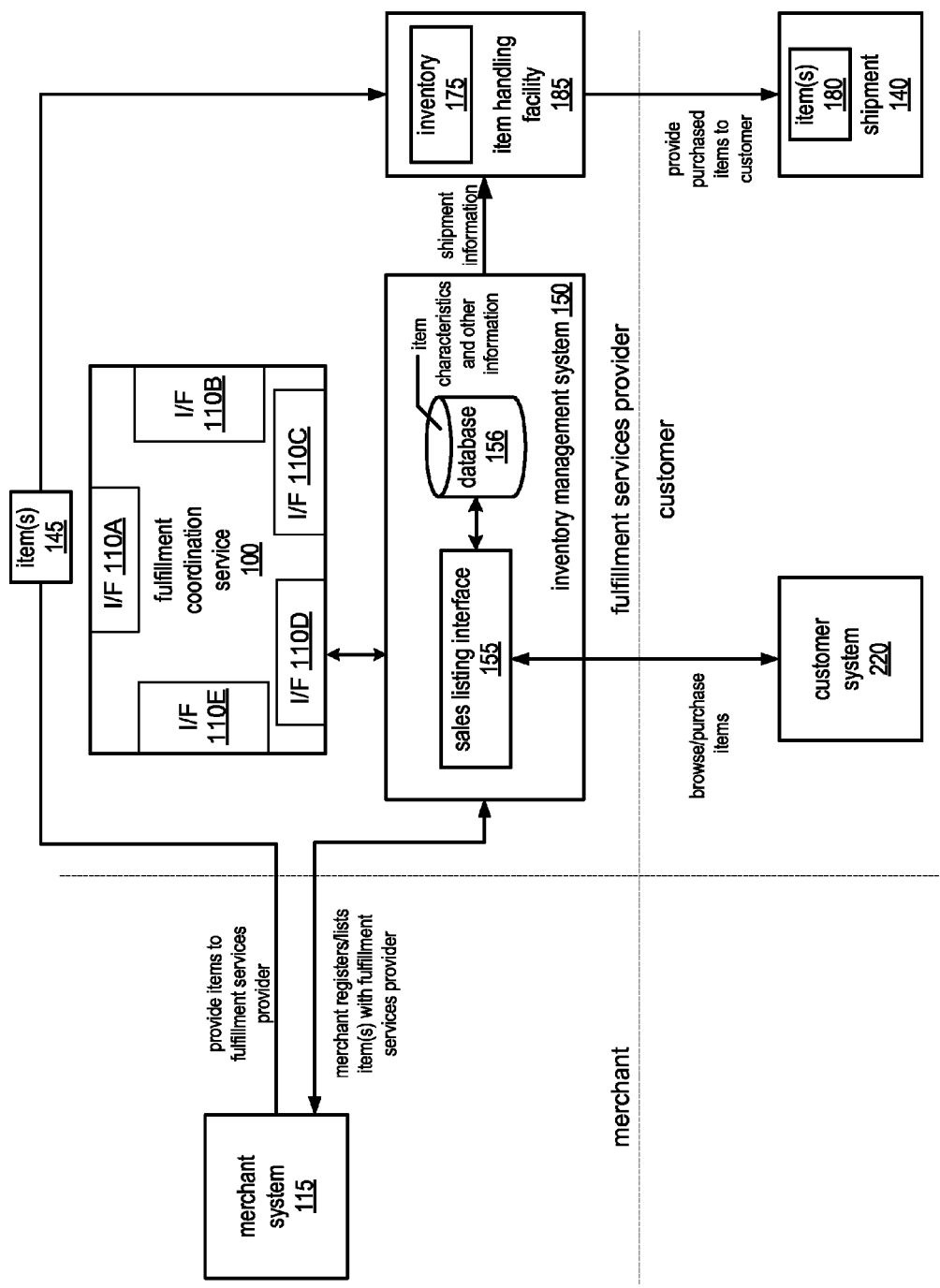
FIGS. 2-6 illustrate block diagrams of various embodiments of a system including a fulfillment coordination service controlled by a fulfillment services provider, as described herein.

FIG. 2 illustrates a system including a fulfillment coordination service (e.g., fulfillment coordination service 100) according to one embodiment. In the illustrated embodiment, fulfillment coordination service 100 may be configured to communicate with an inventory management system of a fulfillment services provider, such as inventory management system 150. In various embodiments, the inventory management system may be owned or operated by the fulfillment services provider. While fulfillment coordination service 100 is illustrated as an item separate from the inventory management system, the fulfillment coordination service may in some embodiments be configured to be a component of the inventory management system or of another system owned or operated by the fulfillment services provider.

The fulfillment services provider may be configured to provide fulfillment services to one or more merchants. In general, fulfillment services may include any actions relating to the storage and processing of items (e.g., item(s) 145) within fulfillment center 10 as well as the fulfillment of specific customer orders for various ones of items 145. For example, fulfillment services may include those tasks involved in receiving items 145 into inventory, such as taking physical receipt of units or quantities of items 145, examining and/or evaluating the condition of received items 145, unpacking or repackaging items 145 if necessary, and storing items 145 within item handling facility 185. Fulfillment services may also include selecting or picking items 145 from item handling facility 185 in response to a customer order, as well as packaging and shipping tasks for providing items to the customer. In some embodiments, fulfillment services may include other tasks undertaken on behalf of a merchant, such as inspecting or monitoring the quantity and/or condition of items 145 while stored in item handling facility 185 (e.g., stored as inventory 175), receiving and processing items 145 returned from customers, processing and disposing of items 145 that are unmarketable for various reasons (e.g., items 145 that are surplus, damaged, expired, spoiled, etc.), engaging in customer service activities (e.g., responding to complaints, inquiries, etc.) with customers, or other types of tasks.

In various embodiments, merchant system 115, which may be a computer system or other system owned or operated by the illustrated merchant, may be configured to enable a user to register or list items for fulfillment services. For instance, the merchant may desire to sell one or more items (e.g., item(s) 145), but may not have the ability or desire to provide fulfillment services for sale of such items. For example, in some cases, the merchant may not have the requisite infrastructure for fulfilling orders for item(s) 145; in other cases, it may be profitable and/or convenient for the merchant to have a another party (e.g., the illustrated fulfillment services provider) provide fulfillment services for item(s) 145. In one embodiment, the merchant may utilize merchant system 115 to access an interface (e.g., a network-based interface, such as a website or web-based account) of inventory management system configured to enable merchants to register or list items for sale. For example, through such interface, the merchant may select or search for items (e.g., item(s) 145) within database 156. For instance, database 156 may store searchable item description characteristics for multiple items. Such characteristics may include keywords associated with various items, text-based descriptions of various items (e.g., a description of an item's features or a description of an item's physical appearance), prices for various items, dimensions of various items, weights for various items, and/or images (and/or video or other multimedia) of various items. The merchant may also use merchant system 115 to specify quantities of each item 145 for which fulfillment services should be provided by the fulfillment services provider.

As described in more detail below, inventory management system may create sales listings for the items registered by the merchant. In some cases, such sales listings may be based on or include information from the item description information of database 156. While database 156 is illustrated as a component of inventory management system 150, database 156 may in various other embodiments be implemented by another system controlled by the illustrated fulfillment services provider. In some embodiments, database 156 may be provided and/or controlled by an entity other than the illustrated fulfillment services provider. For instance, in some embodiments, database 156 may be provided and/or controlled, e.g., by another fulfillment services provider or, e.g., by a product manufacturer. In some embodiments, another entity may provide database 156 and provide its functionality to the fulfillment services provider via a network-based interface (e.g., a web-services interface).

In the illustrated embodiment, the merchant may also provide item(s) 145 (e.g., items registered or listed with the fulfillment services provider via the interface provided by inventory management system 150) to the fulfillment services provider. For instance, the merchant may ship item(s) 145 via one or more shipments to the fulfillment services provider. For instance, the merchant may ship the items via a shipping carrier to an address of item handling facility 185. In various embodiments, to ship the items to the fulfillment services provider, the merchant may affix shipping labels provided by the fulfillment services provider to packages or shipping containers containing items 145. In some embodiments, the fulfillment services provider may provide shipping containers (which may be pre-labeled with, e.g., prepaid shipping labels) in which the merchant may pack items 145. Subsequent to packing items 145 in such shipping containers, the merchant may ship the shipping containers (including items 145) to the fulfillment services provider. The fulfillment services provider may store items 145 as inventory 175 of item handling facility 185. Note that the fulfillment services provider may provide fulfillment services to multiple (and in some cases many) different merchants. Accordingly, item handling facility 185 may handle multiple different items from multiple different merchants. Likewise, inventory 175 may include multiple different items from multiple different merchants.

In various embodiments, the fulfillment services provider may also communicate and/or interact with one or more customers, such as the illustrated customer of FIG. 2. For example, inventory management system 150 may include a sales listing interface (e.g., sales listing interface 155) configured to provide sales listings generated by the inventory management system 150. For instance, for items registered with the fulfillment services provider, the inventory management system may locate corresponding item description information from database 156. Inventory management system 150 may generate a sales listing, such as a product webpage, to offer the item for sale to one or more customers, such as the customer of the illustrated embodiment. Note that while the fulfillment services provider may offer the items (e.g., items 145) for sale via one or more sales listing, the merchant that registered the items may remain the seller of record (e.g., the seller of record with respect to tax or other regulatory purposes) for such items.

As illustrated by the communication between customer system 220 and sales listing interface 155, the customer may browse and/or purchase items via sales listing interface 155. For instance, customer system 220 may be equipped with a web browser configured to view web pages. Accordingly, sales listing interface 155 may provide sales listings to customer system 220 in the form of, e.g., one or more product web pages. The sales listings provided to the customer system may offer one or more items (e.g., one or more of items 145) for sale. For instance, the sales listings may enable a customer to place an order for one or more items and engage in a checkout process. Such checkout process may enable the user to purchase selected quantities of items from the fulfillment service provider's inventory.

After determining that a customer has paid for an order including one or more items (e.g., items from inventory 175), the inventory management system may provide the illustrated shipment information to the item handling facility. The shipment information may indicate that a shipment of one or more particular items (e.g., items of inventory 175) should be shipped to the purchasing customer (e.g., the customer that placed an order for such items). The shipment information may also include information with respect to the contents of the shipment (e.g., the specific items that should be included, the quantities of each item that should be included, etc.) as well as information with respect to shipping the shipment to the customer (e.g., destination and return addresses, a selection of a shipping carrier, and shipping preferences, such as preferences indicating normal or expedited shipping). In the illustrated embodiment, the fulfillment services provider may ship purchased items (e.g., items 180) to the customer within shipment 140, which may include one or more shipping containers. Such shipment may be shipped according to the shipment information provided to the item handling facility.

Figure 3:
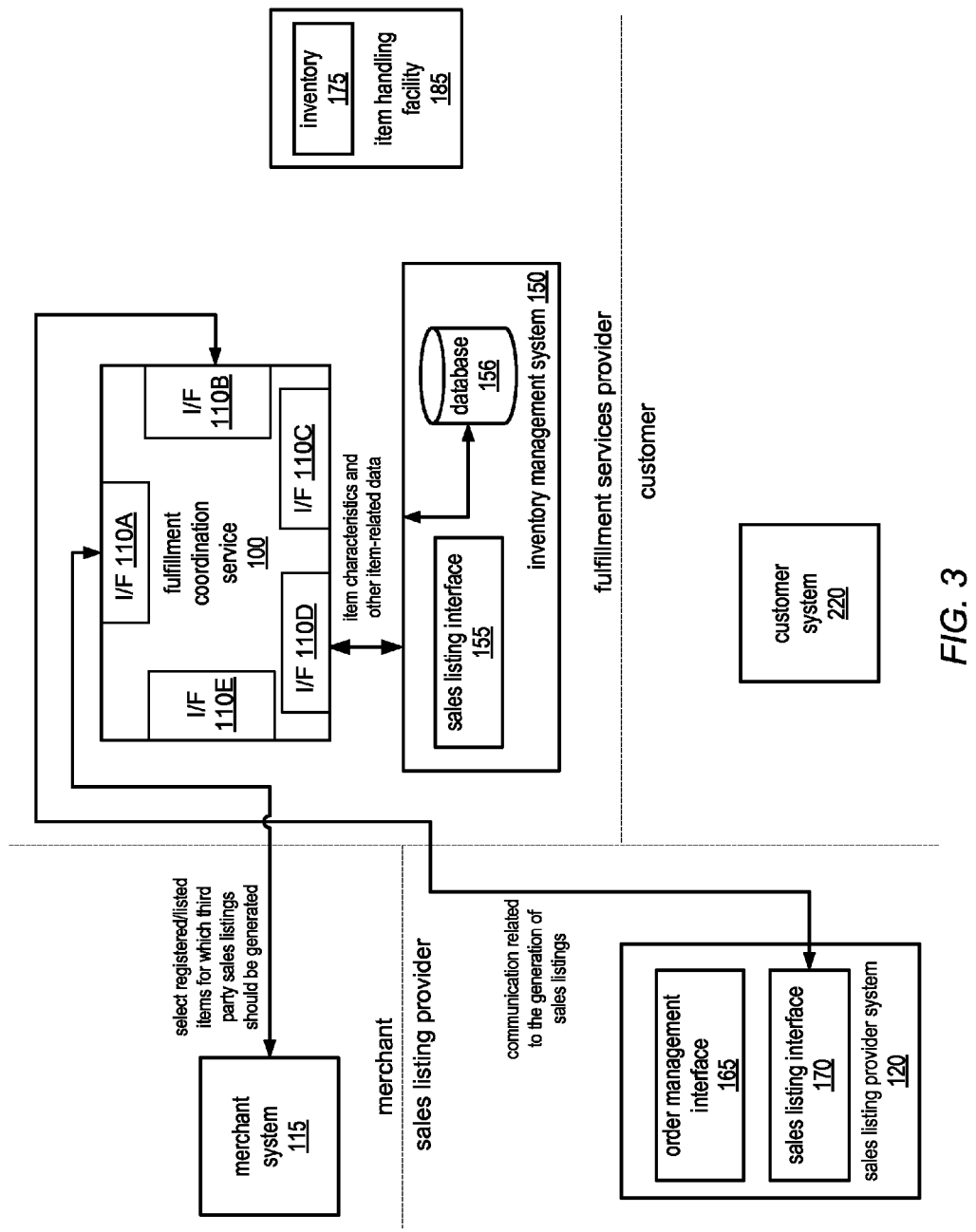

FIG. 3-6 illustrate the operation of the fulfillment coordination service 100 according to various embodiments. More specifically, FIG. 3 illustrates the operation of the fulfillment coordination service with respect to the generation of sales listings on a computer system of a sales listing provider. Note that the illustrated sales listing provider may be a commercial entity that is different than and/or separate from the illustrated fulfillment services provider and/or the illustrated merchant. For instance, in one embodiment, the illustrated sales listing provider may be an online auction provider that enables customers to bid on (and win) one or more items listed for auction with the sales listing provider. In other cases, instead of online auctions, the sales listings provided by the sales listing provider may be product web pages, such as described above with respect to sales listing interface 155. In various embodiments, it may be beneficial for a merchant to have a particular item(s) listed for sale in multiple locations. For instance, in some cases, listing a particular item(s) for sale with the illustrated fulfillment services provider and the illustrated sales listing provider may increase the particular item's exposure to customers and, in some cases, increase the chance that such item will be purchased.

As described above, the illustrated fulfillment services provider may provide a database (e.g., database 156) of item description information. Such information may include keywords associated with various items, text-based descriptions of various items (e.g., a description of an item's features or a description of an item's physical appearance), prices for various items, dimensions of various items, weights for various items, and/or images (and/or video or other multimedia) of various items. In various embodiments, database 156 may include item description information for each item of inventory 175. Since inventory 175 may include multiple items registered and provided by multiple merchants, database 156 may include a wealth of item description information for various items. Fulfillment coordination service 100 may leverage (or use) such item description information from database 156 to generate sales listings on computer systems of entities other than the illustrated fulfillment services provider. In this way, the sales management interface may enable merchants to quickly and efficiently create sales listings in venues or marketplaces beyond the illustrated fulfillment services provider. As described above, the existence of multiple sales listings for a particular merchant's items may increase the exposure of such items and, in some cases, increase the chance that such items will be purchased.

In various embodiments, fulfillment coordination service 100 may enable merchants to view a record of their inventory (e.g., items 145 stored within inventory 175) and select one or more items for which additional sales listings (e.g., sales listings other than those provided by sales listing interface 155 as described above) are to be generated. Such additional sales listings may in various embodiments be hosted by entities other than the illustrated fulfillment services provider, such as the illustrated sales listing provider. To enable a merchant to select items from their inventory for which such additional sales listings should be generated, fulfillment coordination service 100 may be configured to provide an interface, such as merchant interface 110A (illustrated as "I/F 110A"). Merchant interface 110A may be configured to provide merchant system 115 with a user interface for selecting items from the merchant's inventory for which such additional sales listings are to be generated. In some embodiments, the user interface may be accessible over a network; for example, the user interface may be a web-based interface and the merchant system may access the user interface via the Internet. In some cases, merchant interface 110A may require the merchant system to provide user authentication data, such as a username and password, before accessing the user interface.

As illustrated by the communication between merchant system 115 and merchant interface 110A, the user interface may enable the merchant to select one or more of the items via merchant system 115. The merchant may use merchant system 115 to select one or more of the merchant's registered items (e.g., items for which the fulfillment services provider provides fulfillment services on behalf of the merchant) and indicate such selection to the fulfillment coordination service. For each selected item, the fulfillment coordination service may be configured generate a sales listing on another computer system, such as sales listing provider system 120. Furthermore, the fulfillment coordination service may be configured to generate a sales listing for a particular item based on corresponding item description information from database 156. To do so, the fulfillment coordination service may, as illustrated in FIG. 3, access item description information and other item-related data from database 156. As described above, this information may include keywords associated with various items, text-based descriptions of various items (e.g., a description of an item's features or a description of an item's physical appearance), prices for various items, dimensions of various items, weights for various items, and/or images (and/or video or other multimedia) of various items.

In various embodiments, fulfillment coordination service 100 may include management interface 110B (illustrated as I/F 110B) for communicating with a sales listing interface (e.g., sales listing interface 170) of sales listing provider system 120. In various embodiments, management interface 110B and/or sales listing interface 170 may include one or more web services interfaces configured to send and receive calls over a network such as the Internet.

In various embodiments, the fulfillment coordination service may generate a sales listing and subsequently provide the sales listing to the sales listing provider system. In other cases, the sales listing component may send via management interface 110B one or more commands (e.g., sales listing generation commands) to the sales listing provider system via sales listing interface 170. Sales listing provider system 120 may be configured to generate a sales listing in response to such commands received from fulfillment coordination service. In some embodiments, commands sent to sales listing provider system 120 from fulfillment coordination service 100 may indicate that data from database 156 (e.g., item description information) is to be included in a sales listing generated by the sales listing provider system. In these cases, the fulfillment coordination service may be configured to provide such data to the sales listing provider system. In this way, whether the fulfillment coordination service generates the sales listing locally or, alternatively, generates the sales listing by sending sales listing generation commands (and/or item description data), the fulfillment coordination service may be configured to generate one or more sales listings on other computer systems, including computer systems of entities other than the fulfillment services provider (e.g., sales listing provider system 120).

In various embodiments, the sales listings generated by the fulfillment coordination service on sales listing provider system 120 may include auction-based sales listings. For instance, unlike some sales listings that provide a fixed price at which a customer may purchase the item(s) of the sales listing, an auction-based sales listing may enable a customer to bid on an item. In some cases, such sales listing may enable multiple customers to bid on the same item. Additional description of auction-based sales listings is provided below with respect to FIG. 5.

Figure 4:
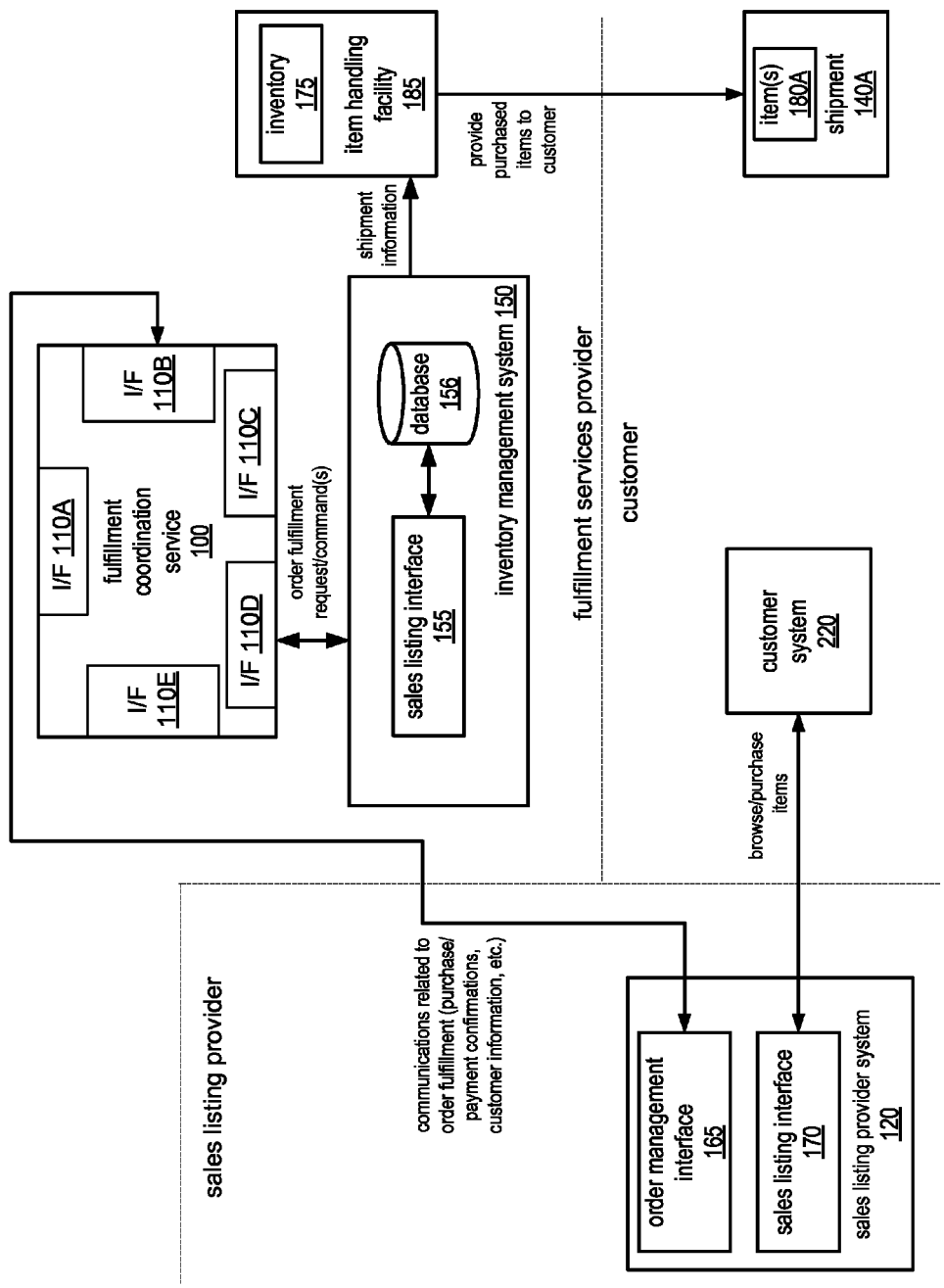

FIG. 4 illustrates the purchase of one or more items via the sales listings provided by a sales listing provider system. Note that the illustrated merchant of FIGS. 1-3 is omitted from FIGS. 3-6 for clarity. Similar to the browsing and purchasing of items via sales listing interface 155 described above, the illustrated customer may utilize customer system 220 to browse and/or purchase items via sales listing interface 170. For instance, sales listing interface 170 may be configured to provide sales listings for various items e.g., items 145, which may be stored as inventory 175. Additionally, customer system 220 may be equipped with a web browser and sales listing interface 170 may be configured to provide one or more product web pages through which the customer may place an order for one or more items, such as items of inventory 175.

In the illustrated embodiment, sales listing provider system 120 may be configured to receive payment from customer system 220 (e.g., receive a valid credit account number, a bank account and routing number pair, as well as authorization/authentication information, such as a password or personal identification number, etc.) for a particular monetary amount (e.g., the cost of one or more items of the order). Once the customer has paid for the item(s) of the order, the sales listing provider system may send a notification of such payment to fulfillment coordination service 100. In some cases, such notification may include an indication of the purchased item(s), an indication of the total cost for the order, an indication of shipping preferences (e.g., preferences indicating normal or expedited shipping, and/or selection of a shipping carrier, etc.), a "ship-to" address (e.g., the address to which the item(s) are to be shipped), and/or additional information (e.g., coupon or discount codes, shipping discounts, gift wrapping options, etc.). In one embodiment, the fulfillment coordination service may query the order management interface (e.g., via a web service call) for such information. In this way, information can be "pushed" from sales listing provider system 120 to fulfillment coordination service 100 or, alternatively, "pulled" by the sale management component from the sales listing provider system. In some cases, during the same communication session, some portions of information may be pushed by the sales listing provider system to the fulfillment coordination service while other portions may be pulled from the sales listing provider system by the fulfillment coordination service. Note that the fulfillment coordination service and/or the sales listing component may perform such pushing and/or pulling via one or more web service calls. For instance, the order management interface may send a notification that indicates a customer has purchased a particular item. In response, the fulfillment coordination service may query (e.g., via a web service call) the sales listing provider system for additional information, such as the shipping address to which the particular item is to be shipped (or any of the other information described above).

After being notified that a customer has submitted payment for an order of one or more items, the fulfillment coordination service may generate an order fulfillment request for the order. The order fulfillment request may specify the item(s) (e.g., items of inventory 175) to be fulfilled (e.g., located, handled, packaged, and/or shipped to the purchasing customer) as well as shipping information (e.g., preferences indicating normal or expedited shipping, and/or selection of a shipping carrier, etc.), a "ship-to" address (e.g., the address to which the item(s) are to be shipped), and/or additional information (e.g., coupon or discount codes, shipping discounts, gift wrapping options, etc.). Note that while such element is referred to as a "request," the order fulfillment request may in some embodiments actually comprise one or more commands with respect to the fulfillment of an order of one or more items (e.g., a command to fulfill the order). The inventory management system may be configured to generate shipment information based on the order fulfillment request, such as the illustrated shipment information transmitted from inventory management system 150 to item handling facility 185. Similar to the operation of the item handling facility described with respect to FIG. 2, item handling facility 185 may use the shipment information to, e.g., locate the appropriate items of inventory 175 (e.g., items 180A, which may be the particular items purchased by the customer via sales listing interface 170), package such items as shipment 140A, and ship such shipment to the customer.

In the illustrated embodiment of FIG. 4, the processing of payment for a purchased order of one or more items (e.g., receiving and verifying payment provided by the customer) may be performed by the sales listing provider system. However, in various embodiments, as illustrated with respect to FIG. 5, the fulfillment coordination service may be configured to communicate with a payment system (e.g., payment service provider system 125) separate from the sales listing provider system. In various embodiments, the payment service provider may be a commercial entity other than the illustrated fulfillment services provider. Similarly, the payment service provider may also be a commercial entity other than the illustrated sales listing provider. However, in some embodiments, the sales listing provider and the payment service provider may be of the same commercial entity. For instance, payment service provider system 125 and sales listing provider system 120 may in some embodiments be provided by a single commercial entity (separate from or different than the fulfillment services provider).

Figure 5:
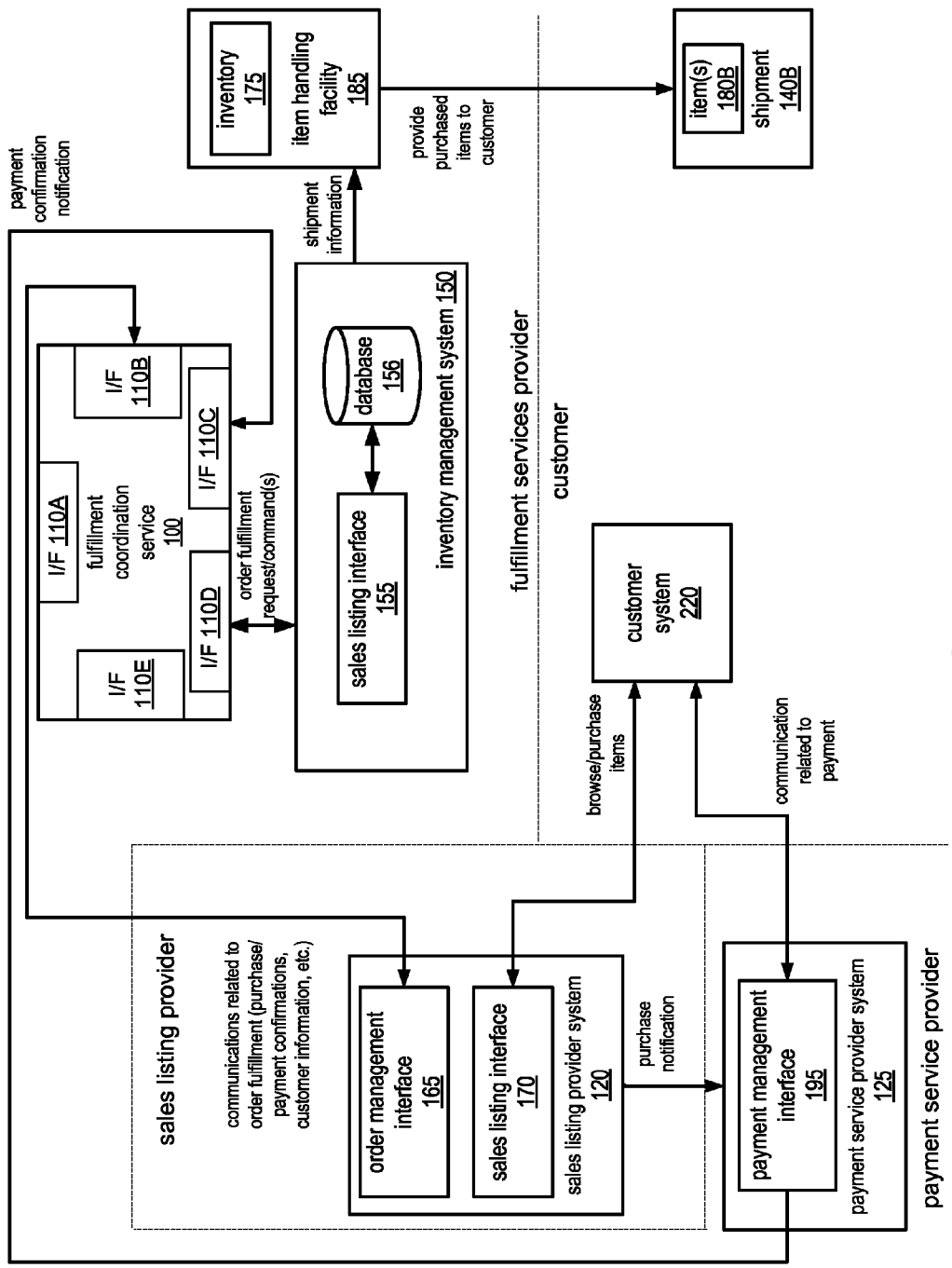

In the illustrated embodiment of FIG. 5, the customer may, via customer system 220, browse or purchase items in a similar manner as described above with respect to FIG. 4. For instance, the customer may place an order for one or more items (e.g., items 145 of inventory 175) via sales listing interface 170. However, in this embodiment, the processing and verification of payment for such order (e.g., obtaining payment method from customer, verifying credit accounts, verifying bank account and routing numbers, transferring funds from the customer account to an account of the payment service provider and/or sales listing provider, etc.) may be performed by payment service provider system 125. For instance, in response to the customer placing an order for one or more items, sales listing provider system 120 may provide payment service provider system 125 with a purchase notification that indicates the illustrated customer has placed an order for one or more particular items. Such notification may include a total amount of funds owed by the customer for payment of the order. To complete payment for the order, the customer may initiate a communication session between customer system 220 and payment management interface 195. Alternatively, payment service provider system 125 may, e.g., send an invoice or other notification to the customer (e.g., an electronic mail invoice indicating an amount due) in order to initiate a communication session between the customer and the payment service provider. In either case, payment management interface may be configured to receive payment information (e.g., account numbers for credit, bank, or other financial accounts with which payment for the ordered items may be made) as well as user authentication/authorization information (e.g., usernames, passwords, personal identification numbers, etc.) from customer system 220.

In some embodiments, the customer may have a payment account established with the payment services provider. Such account may enable the customer to provide via customer system 220 a username and password (e.g., an email address and alphanumeric code, respectively) or other authentication/authorization information associated with the customer. Payment service provider system 125 may be configured to verify the correctness of the username and password (or other authentication/authorization information) with respect to records of payment service provider system 125. If such information is correct, the payment system may be configured to retrieve previously stored financial information (e.g., identifiers and authorization information for credit accounts, bank accounts, etc.) with which the customer may pay for the order.

In various embodiments, payment management interface 195 may be accessible to customer system 220 via a network, such as the Internet. For example, customer system 220 may be equipped with a web browser and payment management interface 195 may be configured to provide (e.g., via a web server) one or more web pages to such web browser. For instance, the illustrated customer may utilize customer system 220 to access an online payment account provided by payment management interface 195. For example, such account may enable a customer to view outstanding orders, such as orders for one or more items purchased via sales listing provider system 120. In such an embodiment, the customer may authorize payment for one or more of the outstanding orders via the online payment account.

After successfully processing the payment for the order (e.g., successfully debiting a customer account an amount due for the particular order), the payment service provider may provide a payment confirmation notification, which indicates that the customer has paid for the item(s) purchased via the sales listing provider system, to the fulfillment services provider via management interface 110B. Such notification may include various information including but not limited to an order identifier that uniquely identifies an order placed by a customer via the sales listing provider system, a purchase price for the order, a customer identifier that uniquely identifies the customer, and/or a sales listing identifier that uniquely identifies a sales listing.

Subsequent to receiving the payment confirmation notification from payment management interface 195, fulfillment coordination service 100 may be configured to query the sales listing provider system for additional information with respect to the order. For example, the fulfillment coordination service 100 may be configured to query order management interface 165 via management interface 110B. For instance, if the payment confirmation notification includes an order identifier that identifies the order, the fulfillment coordination service 100 may query the sales listing provider system for additional information including but not limited to information indicating the specific items of the order, quantities of such items, a ship-to or destination address for the items (e.g., the location to which the items are to be shipped), and/or shipping preferences as described above. In various embodiments, management interface 110B may be configured pull such additional information via order management interface 165. Alternatively, order management interface 165 may be configured to push information to management interface 110B. As demonstrated by the illustrated embodiment, fulfillment coordination service 100 may be configured to generate an order fulfillment request based on the payment confirmation notification and/or such additional information retrieved from the sales listing provider system. Such order fulfillment request may be generated in a manner similar to the manner described above with respect to FIG. 4. Similarly, inventory management system 150 may (e.g., in response to the order fulfillment request) provide shipment information to item handling facility 185 in a manner similar to the manner described above with respect to FIG. 3. Subsequent to receiving the shipment information, the item handling facility may prepare shipment 140B including the purchased items (e.g., items 180B) and shipment 140B to the customer in a manner similar to the manner described above with respect to FIG. 3.

In one particular embodiment, the merchant (not illustrated in FIG. 5 for clarity) may create one or more sales listings via fulfillment coordination service 100 as described above in regard to FIG. 3. Such sales listings may include auctions configured to enable one or more customers to bid on item(s) of the auction. In some cases, such auctions may be time dependent. That is, at a particular time, the auction may end and the highest bidder (e.g., a customer that places a bid) at that time may win the items of the auction. In some embodiments, a bid (which typically includes a price) may be a contractual obligation to pay for the items of the auction at such price (e.g., if the customer wins the auction). When a merchant accesses the fulfillment coordination service via merchant interface 110A, the merchant may select one or more items from inventory (e.g., ones of items 145 of inventory 175) of the fulfillment services provider. As described above, such items may be items for which a.) the merchant is the seller of record and b.) the fulfillment services provider provides fulfillment services. As described above, the fulfillment services provider may offer such items for sale via sales interface 155.

For each of the selected items, the fulfillment coordination service may be configured to create an auction (which may be one type of sales listing) based on item description information, such as item description information of database 106. Note that the descriptions of auctions provided herein may also, in various embodiments, apply to sales listings in general. Such item description information may include keywords associated with various items, text-based descriptions of various items (e.g., a description of an item's features or a description of an item's physical appearance), prices for various items, dimensions of various items, weights for various items, and/or images (and/or video or other multimedia) of various items. In various embodiments, the item description information may have been obtained by the inventory management system from, e.g., item manufactures. In other cases, such item description information may be generated by the fulfillment services provider. For example, images of items may be captured by the fulfillment services provider and added to database 106. The fulfillment coordination service may be configured to create the auctions from (and/or based on) such item description information. For example, the fulfillment coordination service may be configured to generate auctions that include item descriptions that are automatically generated (e.g., by the fulfillment coordination service) from the item description information of database 106. Note that, in various embodiments, this same information may be used by the inventory management system to create sales listings (for the same items for which auctions are generated) offered to customers via sales listing interface 155. In this way, fulfillment coordination service 100 may "leverage" (e.g., utilize) the data of database 156, which may also be used to generate sales listings of sales listings interface 155, in order to create sales listings that will be hosted by another commercial entity (e.g., the illustrated sales listing provider).

In some embodiments, the generation of auctions may be automatic. For instance, the fulfillment coordination service may generate an auction without input from the merchant. However, in various embodiments, auctions generated may be based on (and/or may include) information provided by the merchant. For instance, the merchant may provide to the fulfillment coordination service information including but not limited to an auction start time, auction end time, initial start price of the auction (e.g., the minimum monetary amount that the first bidder must bid), the size of bid increments (e.g., the monetary amount by which a particular bid must exceed a previous bid), and/or the auction type (e.g., traditional, Dutch, Chinese, fixed price).

In various embodiments, the fulfillment coordination service may store a mapping of generated auctions to items within inventory 175. For instance, auctions may be identified by an auction identifier ("auction ID") and items in inventory 175 may be identified by an item identifier ("item ID"). In this example, the fulfillment coordination service may generate and/or store a mapping of auction IDs to corresponding item IDs. Such mapping may be stored in the sale management component or another system of the fulfillment services provider (e.g., database 106) and utilized in a manner described in more detail below with respect to order fulfillment requests.

The auctions generated by the fulfillment coordination service may be generated in a manner similar to the manner described above with respect to FIG. 3. That is, in some embodiments, the auctions may be generated (e.g., one or more generated web pages representing an auction) and provided to the sales listing provider system (e.g., via management interface 110B and sales listing interface 170). Alternatively, the fulfillment coordination service may send one or more auction generation commands to the sales listing interface of the sales listing provider system in order to generate an auction. In either case, the fulfillment coordination service may be configured to generate auctions on sales listing provider system 120. Such auctions may be accessible to the illustrated customer via sales listing interface 170. For instance, the customer could search (e.g., via keyword) for one or more auctions pertaining to a particular item or type of item.

After a customer wins an auction (e.g., by being the highest bidder for the auction), the customer may participate in a payment process similar to the payment process described above. In one embodiment, the customer may begin the payment process by accessing a network address within the auction (e.g., a hyperlink) that directs the customer to payment management interface 195. The customer may enter payment details and pay for the items of the auction as described above.

Once the customer has paid for the auction, payment service provider system 125 may send a payment confirmation notification to the fulfillment coordination service. Such payment confirmation notification may include but is not limited to a payment status (e.g., payment "complete"), a merchant identifier (e.g., the merchant's email address), a transaction identifier ("transaction ID"), and the auction ID.

The fulfillment coordination service may be configured to utilize the payment confirmation notification to determine the items of the auction. In one embodiment the payment confirmation notification may specify the items won by the customer. Alternatively, the payment confirmation notification may, instead of specifying the items won by the customer, specify the auction ID. Accordingly, in some embodiments, the fulfillment coordination service may query sales listing provider system 120 with the auction ID in order to determine the items won by the customer. In this cases, the sales listing provider system may receive the query, lookup the respective auction (or a record of the auction) by the auction ID, and provide the fulfillment coordination service with a message specifying the items of the auction. In some cases, the fulfillment coordination service may access the mapping of auction IDs to corresponding item IDs (described above) in order to determine the items won by the customer. Once fulfillment coordination service 100 determines the items won by the customer, the fulfillment coordination service may generate an order fulfillment request, the inventory management system may generate corresponding shipping information, and the item handling facility may ship the shipment (including the items won via auction) to the customer as described above.

In various embodiments, the fulfillment coordination service described herein may be configured to verify the accuracy of a generated auction over the course of the auction's life. For instance, for a particular item's auction, the fulfillment coordination service may track and analyze the state of the auction at various intervals to ensure that the auction reflects true and accurate details for the particular item. For instance, the fulfillment coordination service may be configured to compare item description information from the auction listing to corresponding item description information of database 156. For instance, if a merchant were to modify an auction after the auction is generated by the fulfillment coordination service, the fulfillment coordination service may verify the accuracy of such modifications (e.g., whether the modification describes the actual item up for auction) with respect to item description information of database 156. In this way, the fulfillment coordination service may in various embodiments prevent merchants from misrepresenting items to be fulfilled by the fulfillment services provider.

In some embodiments, the fulfillment coordination service may be configured to communicate with additional service providers configured to provide services for items fulfilled by the fulfillment services provider. For instance, in one embodiment, a separate customer service provider may be employed to provide customer service for one or more items that are fulfilled by the fulfillment services provider. For instance, in addition to an order fulfillment request for one or more particular items, the fulfillment coordination service may be configured to generate a customer service request and provide such request to a computer system of a customer service provider. Accordingly, the customer service provider may, for each item specified by the customer service request, perform a variety of services including but not limited to providing tracking services (e.g., tracking the shipped items in transit to ensure proper delivery), fielding customer calls regarding such items, and/or managing returns/exchanges for such items.

Figure 6:
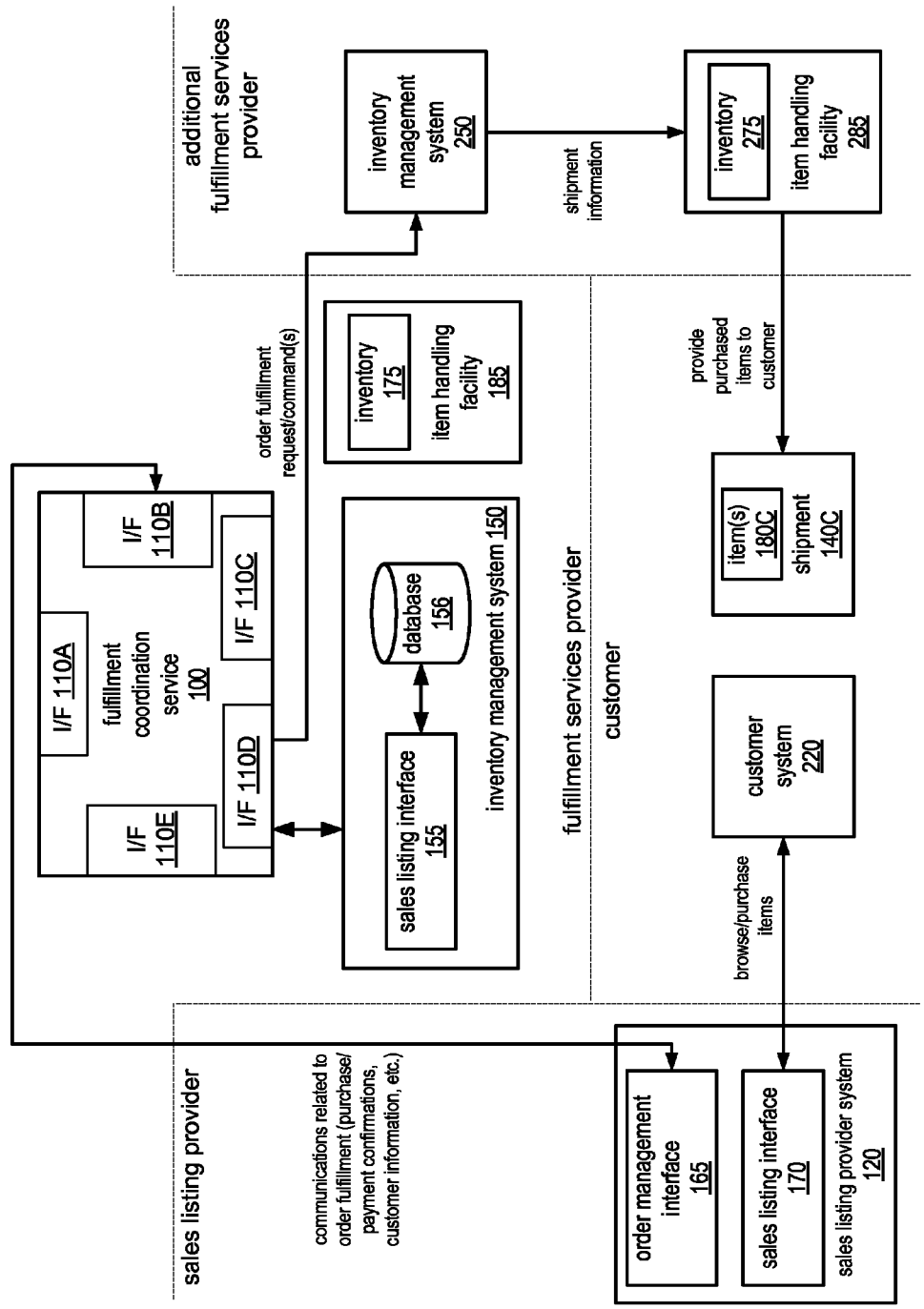

As illustrated by FIG. 6, in various embodiments, the fulfillment coordination service may be configured to communicate with multiple fulfillment service providers and determine which of such fulfillment service providers is most suitable for fulfilling a particular order. In the illustrated embodiment, in addition to having items registered and managed by a single fulfillment services provider, the merchant may also have additional items registered and managed by an additional fulfillment services provider. The operation of the fulfillment coordination service of FIG. 6 may be substantially similar to the operation described above with respect to FIGS. 1-5. However, in the illustrated embodiment, when the fulfillment coordination service generates a fulfillment request, it may select or determine to which fulfillment services provider the fulfillment request is to be provided. In various embodiments, the fulfillment coordination service may determine that performance of one of the fulfillment services providers is greater than the performance of the other fulfillment service providers with respect to one or more criteria. Such criteria may include but is not limited to, e.g., inventory levels of the particular item (e.g., if the provider has the items of the fulfillment request in stock, and, if so, how many of such items), handling time for the particular item (e.g., how long it will take to prepare the items for shipping, as well as average shipping times), and location of the particular item (e.g., the proximity of the provider's inventory to the destination address of the order). In the illustrated embodiment, the fulfillment coordination service has determined that performance of the illustrated additional fulfillment services provider is greater than the performance of other fulfillment services providers. Accordingly, in the illustrated embodiment, the fulfillment coordination service may provide the order fulfillment request to inventory management system 250 for fulfillment by the additional fulfillment services provider (which may be a commercial entity that is different than and/or separate from the illustrated fulfillment services provider). Note that inventory management system 250, item handling facility 285, and inventory 275 may be configured and/or operate in a manner similar to the like-labeled items of FIGS. 1-5 (e.g., inventory management system 150, item handling facility 185, and inventory 175, respectively).

Figure 7:
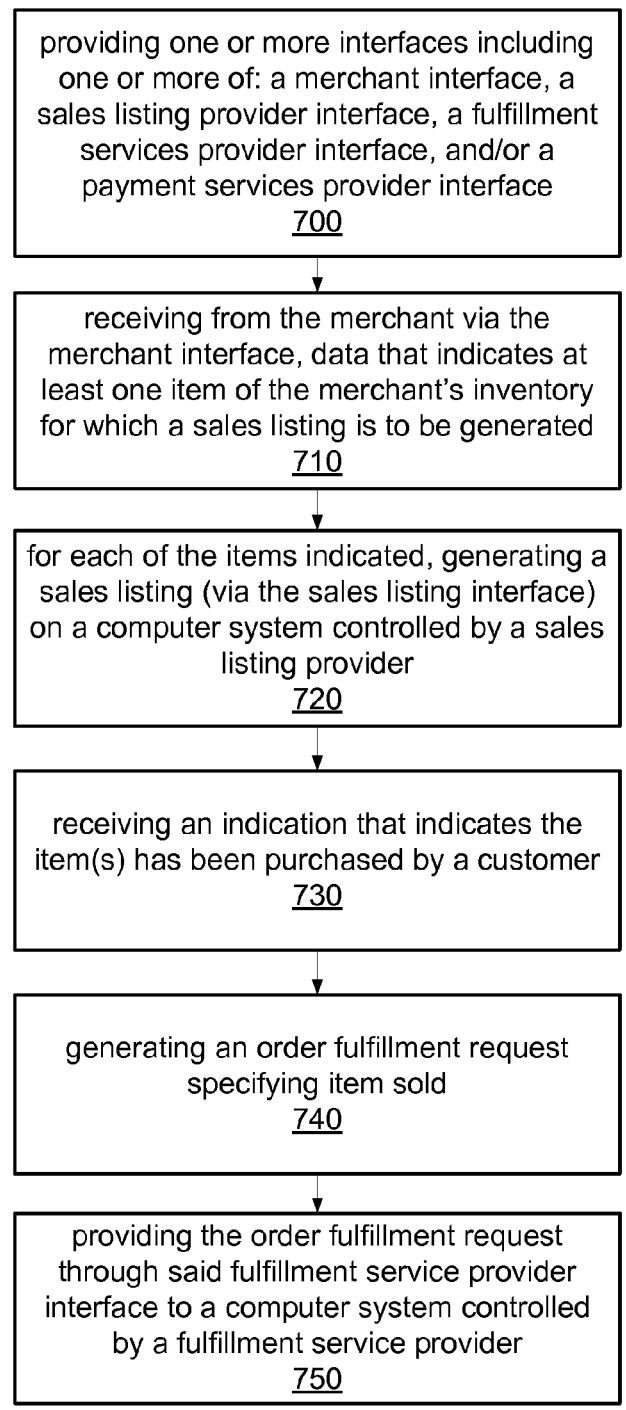
FIG. 7 illustrates a flowchart of a method that may be implemented by a fulfillment coordination service of a fulfillment coordination service provider, according to various embodiments.

Various methods may be employed by the fulfillment services provider and/or the fulfillment coordination service described herein. Examples of such methods are illustrated by FIGS. 7-10. FIG. 7 illustrates the generation of sales listings and order fulfillment requests according to some embodiments. As illustrated by step 700, the method may include providing one or more interfaces including one or more of a merchant interface (e.g., interface 110A), a sales listing provider interface (e.g., interface 110B), a fulfillment services provider interface (e.g., interface 110D), a payment services provider interface (e.g., interface 110C). In some embodiments, the method may also include providing other interfaces (e.g., interfaces 110E). As described above, the interfaces provided may be accessible via various computer networks including LANs, WANs, or combinations thereof. Additionally, such interface may in various embodiments be implemented via web service interfaces or APIs.

The method may also include receiving data from the merchant (or a computer system controlled by the merchant) via the merchant interface (e.g., step 710). Such data may indicate one or more items of the merchant's inventory for which sales listing are to be generated. For instance, as described above with respect to FIG. 3, a merchant (via merchant system 115) may provide data to interface 110 of fulfillment coordination service 100. For example, such data may indicate one or more items of the merchant inventory, such as items of inventory 175, for which sales listings should be generated. As illustrated by step 720, the method may further include generation sales listings for each of the items. For instance, such sales listing may be product web pages or auction based listings, as described in more detail above.

In various embodiments, the method may include providing such sales listings to various sales listing providers. As described above with respect to FIGS. 1-6, the sales listing provider may enable one or more customer to purchase corresponding items through the sales listings. For instance, the sales listing provider may control a web server that hosts the generated sales listings such that the sales listing are accessible by one or more customers (e.g., accessible over the internet). Accordingly, the method may also include (e.g., step 730) receiving an indication that one or more items have been purchased via the sales listings. For instance, a customer may have purchases an item from a product web page or, alternatively, won an auction-based listing for the item.

As illustrated by step 740, the method may include generating an order fulfillment request specifying the particular items sold to the customer, such as the order fulfillment request described above with respect to FIGS. 1-6. For instance, the order fulfillment request may specify the item(s) (e.g., items of inventory 175) to be fulfilled (e.g., located, handled, packaged, and/or shipped to the purchasing customer) as well as shipping information (e.g., preferences indicating normal or expedited shipping, and/or selection of a shipping carrier, etc.), a "ship-to" address (e.g., the address to which the item(s) are to be shipped), and/or additional information (e.g., coupon or discount codes, shipping discounts, gift wrapping options, etc.). Note that while such element is referred to as a "request," the order fulfillment request may in some embodiments actually comprise one or more commands with respect to the fulfillment of an order of one or more items (e.g., a command to fulfill the order). As illustrated by step 750 the method may also include providing the order fulfillment request to a fulfillment service provider (or computer system controlled by the fulfillment services provider). Such step may include providing the order fulfillment request to the fulfillment service provider via the service provider interface, such as the service provider interface provided by the fulfillment coordination service described herein. In various embodiments, the fulfillment service provider may fulfill the order (e.g., package and ship the items to the purchasing customer) in response to receiving the order fulfillment request, such as described above with respect to FIGS. 1-6.

Figure 8:
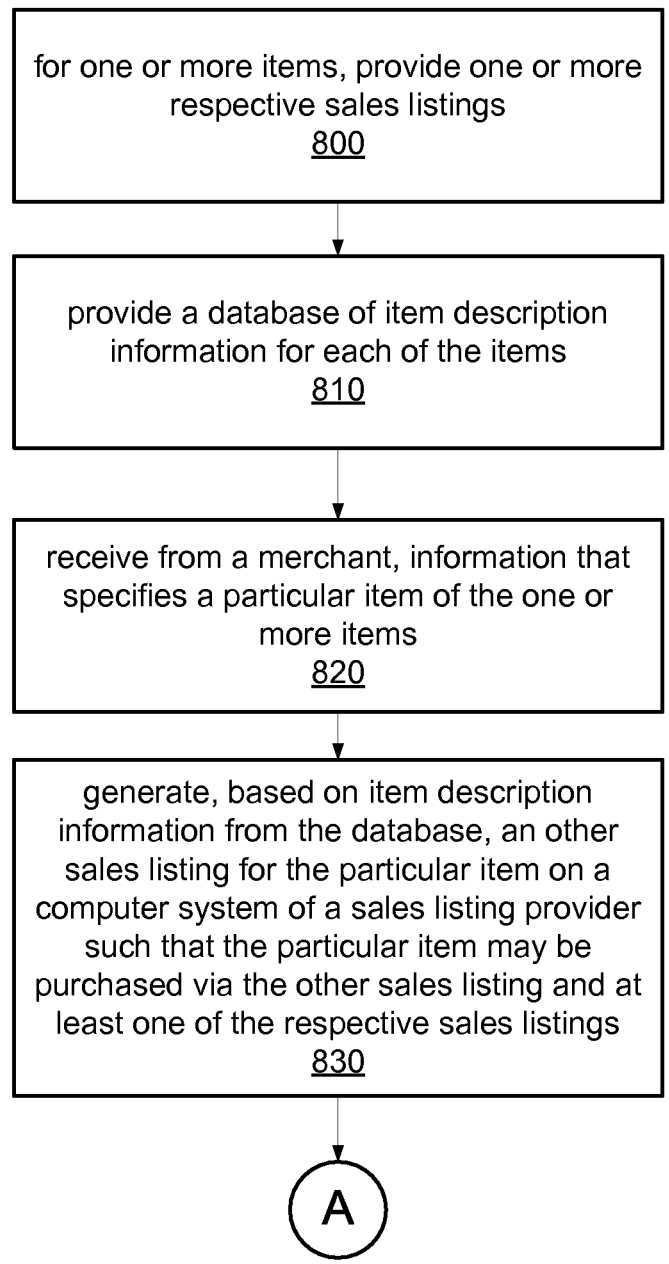
FIG. 8 illustrates a flowchart of a method that may be implemented by a fulfillment coordination service of a fulfillment services provider, according to various embodiments.

As illustrated by FIG. 8, another method that may be implemented by the fulfillment coordination service includes providing one or more respective sales listings (step 800). For instance, as described above, sales listing interface 155 may provide one or more respective sales listings for various items that may be sold to customers. As illustrated by item step 810, the method may also include providing a database of item description information for each of the items. Such item description information may include keywords associated with various items, text-based descriptions of various items (e.g., a description of an item's features or a description of an item's physical appearance), prices for various items, dimensions of various items, weights for various items, and/or images (and/or video or other multimedia) of various items. In various embodiments, the method may include obtaining the item description information from, e.g., item manufactures. As illustrated by step 820, the method may also include receiving from a merchant, information that specifies a particular item(s) of the one or more items. For instance, the method may include receiving an indication of items for which additional sales listings (e.g., an auction) should be generated as described above in regard to FIG. 2-6. As illustrated by step 830, the method may also include generating, based on item description information from the database, another sales listing for the particular item on a computer system of a sales listing provider such that the particular item may be purchased via the other sales listing and at least one of the respective sales listings. In this way, a commercial entity performing the method of FIG. 8 may in some embodiments offer the particular item for sale via a sales listing and generate another sales listing for the item on a computer system of a different commercial entity. As described above, this may increase the exposure of the item to potential customers and, in some cases, increase the chance that such item will be sold.

Figure 9:
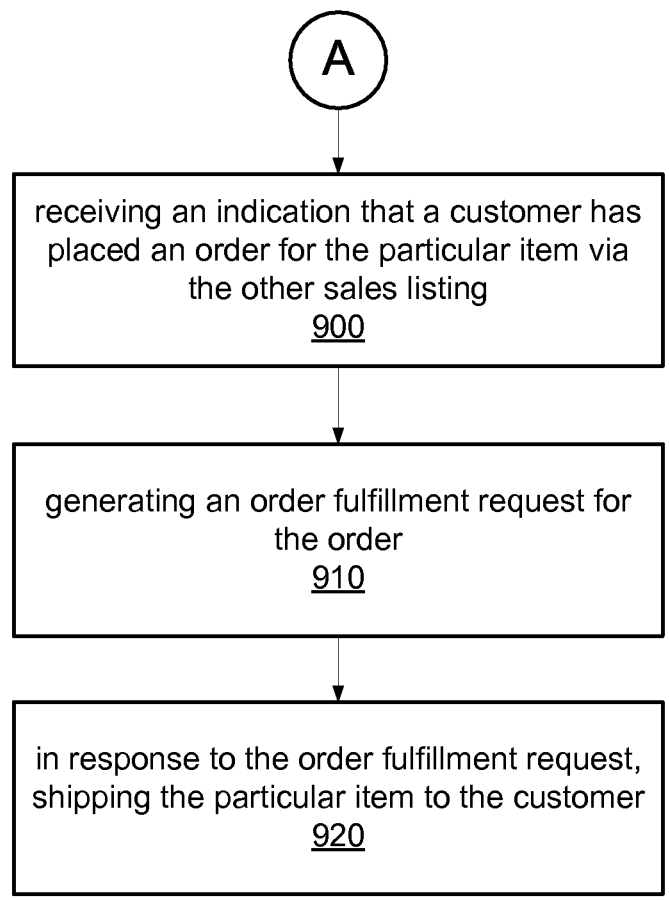
FIG. 9 illustrates a flowchart of a method that may be implemented by a fulfillment coordination service of a fulfillment services provider, according to various embodiments.
Figure 10:
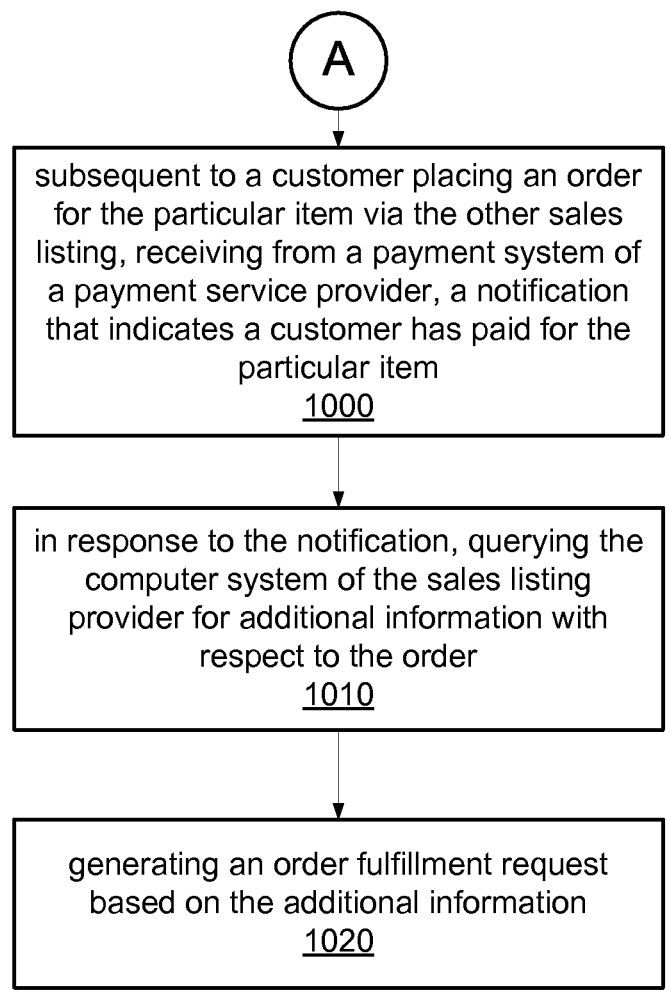
FIG. 10 illustrates a flowchart of a method that may be implemented by a fulfillment coordination service of a fulfillment services provider, according to various embodiments.

FIGS. 9-10 illustrate additional steps that may in some embodiments be performed in addition to the steps illustrated by FIG. 8. Each of the methods illustrated by FIGS. 9-10 may in some embodiments be a continuation of the method of FIG. 8. For instance, step 900 of FIG. 9 includes receiving an indication that a customer has placed an order for the particular item via the other sales listing. For example, the method may include receiving a payment confirmation notification as illustrated in FIG. 4. As illustrated by step 910, the method may also include generating an order fulfillment request for the order. Such order fulfillment request may specify the item(s) (e.g., items of inventory 175) to be fulfilled (e.g., located, handled, packaged, and/or shipped to the purchasing customer) as well as shipping information (e.g., preferences indicating normal or expedited shipping, and/or selection of a shipping carrier, etc.), a "ship-to" address (e.g., the address to which the item(s) are to be shipped), and/or additional information (e.g., coupon or discount codes, shipping discounts, gift wrapping options, etc.). Note that while such element is referred to as a "request," the order fulfillment request may in some embodiments actually comprise one or more commands with respect to the fulfillment of an order of one or more items (e.g., a command to fulfill the order). An example of such order fulfillment request is demonstrated by FIG. 5 as the illustrated communication between the fulfillment coordination service and the inventory management system. As illustrated by step 920, the method may include, in response to the order fulfillment request, shipping the particular item to the customer. Examples of such shipping include the shipping of shipment 140 as illustrated by FIGS. 2-5, which is described above.

As illustrated by step 1000, the method of FIG. 10 may include, subsequent to a customer placing an order for the particular item via the other sales listing, receiving from a payment system of a payment service provider, a notification that indicates a customer has paid for the particular item. Such notification may include various information including but not limited to an order identifier that uniquely identifies an order placed by a customer via the sales listing provider system, a purchase price for the order, a customer identifier that uniquely identifies the customer, and/or a sales listing identifier that uniquely identifies a sales listing. Such payment confirmation notification may also include but is not limited to a payment status (e.g., payment "complete"), a merchant identifier (e.g., the merchant's email address), a transaction ID, and the auction ID. One example of receiving such a notification is demonstrated by the fulfillment coordination service receiving a payment confirmation notification as illustrated by FIG. 4. As illustrated by step 1010, the method may also include in response to the notification, querying the computer system of the sales listing provider for additional information with respect to the order. Such additional information may include but is not limited to information indicating the specific items of the order, quantities of such items, a ship-to or destination address for the items (e.g., the location to which the items are to be shipped), and/or shipping preferences as described above. As illustrated by step 1020, the method may include generating an order fulfillment request based on the additional information. An example of generating such an order fulfillment request includes the fulfillment coordination service of FIG. 4 generating an order fulfillment request before providing such request to the inventory management system.

FIGS. 11A-C illustrate examples of displays that may be employed in various embodiments. Such displays may be generated by the fulfillment coordination service described herein (e.g., fulfillment coordination service 100). As described above, fulfillment coordination service 100 may be configured to receive merchant authentication information from one or more merchants. For instance, merchants may use various merchant systems to provide usernames, passwords, pass codes, security codes, Personal Identification Numbers (PINs), authentication tokens, and/or other authentication information to fulfillment coordination service 100. Such authentication information may enable the fulfillment coordination service to access the various service provider systems on behalf of the user. In some cases, such authentication information may be the same authentication information used by a merchant to access each service provider system independent of the fulfillment coordination service. FIG. 11A illustrates a display (e.g., authentication information submission display 1100A) configured to collect such authentication information from a merchant. As illustrated by fields 1121, 1131, 1141 and 1151, display 1100A may enable a merchant to provide usernames (or other identifiers) for accessing various services, such as the services described above with respect to FIG. 1. As illustrated by fields 1122, 1132, 1142 and 1152, display 1100A may be configured to receive passwords (or pass codes, security codes, and/or other authentication codes) corresponding to the various usernames. In some cases other authentication information (e.g., security tokens or additional authentication codes) may be submitted as illustrated by fields 1123, 1133, 1143 and 1153. Such other authentication information may also include various authentication keys for one or more of the services to which the fulfillment coordination service communicates. In some cases, such other authentication information may also include a Uniform Resource Locator (URL) or other network address of the services to which the fulfillment coordination service communicates. Submit control 1170 enables a merchant to submit their authentication information to the fulfillment coordination service described herein. As described above, the fulfillment coordination service may be configured to use such authentication information for communicating with various service provider systems (e.g., the service provider systems of FIG. 1).

As described above, a merchant may select one or more items for which sales listing are to be generated. FIG. 11B illustrates an inventory selection display (e.g., inventory selection display 1100B). Inventory selection display 1100B may be one example of the type of user interface generated by the fulfillment coordination service described herein. For instance fulfillment coordination service 100 may generate and provide display 1100B to a merchant to enable the merchant to view and select inventory. For instance, inventory items 1175A-N may represent inventory items that the merchant has registered with a fulfillment services provider (e.g., such as inventory 175 of FIG. 1). The merchant may select inventory items (e.g., inventory items 1175A and 1175C) and the fulfillment coordination service may generate sales listings (including, in some cases, auctions) for such inventory items. The merchant may select control 1180 to submit their selections to the fulfillment coordination service described herein.

As described above, the generation of some sales listings may be automatic. For instance, the generation of some sales listings may not require a merchant to supply information to the fulfillment coordination service. However in some cases, the merchant may desire add additional or supplementary information to the sales listings generated by the fulfillment coordination service. FIG. 11 illustrates a display (e.g., display 1100C) for enabling a merchant to view and/or modify the content of a sales listing before such sales listing is available to customers. For instance, the sales listing generation display may include generated content 1185 and merchant-supplied content 1190. Note that in some embodiments it is not required for the merchant to supply content 1190. Generated content 1185 may include sales listing content generated by the fulfillment coordination service. For instance, the fulfillment coordination service may generate generated content 1185 based on item description information from, e.g., database 156. For example, generated content may be a text-based item description and one or more item images. In some embodiments, generated content 1185 may be editable by the merchant. For instance, the merchant may desire to add information about the condition of the item being sold. Merchant-supplied content 1190 may include content supplied by the merchant, such as a sales listing title, a category, an auction type (e.g., if the sales listings is an auction), a price or starting price (e.g., for auctions), quantity of items, and duration (e.g., for auctions). Other content may be added at the merchant's discretion. The merchant may preview, submit, or cancel the sales listing via controls 1191-1193.

Various embodiments of a system and method for managing sales and fulfillment services, as described herein, may be executed on one or more computer systems, which may interact with various other devices. One such computer system is computer system 2200 illustrated by FIG. 12. Computer system 2200 may be capable of implementing a fulfillment coordination service, such as fulfillment coordination service 100. While many of the embodiments described herein refer to the fulfillment coordination service, computer system 2200 may also be configured to implement the systems of FIGS. 1-6 in various embodiments. In the illustrated embodiment, computer system 2200 includes one or more processors 1210 coupled to a system memory 1220 via an input/output (I/O) interface 1230. Computer system 2200 further includes a network interface 1240 coupled to I/O interface 1230, and one or more input/output devices 1250, such as cursor control device 1260, keyboard 1270, and display(s) 1280. In some embodiments, it is contemplated that embodiments may be implemented using a single instance of computer system 2200, while in other embodiments multiple such systems, or multiple nodes making up computer system 2200, may be configured to host different portions or instances of embodiments. For example, in one embodiment some elements may be implemented via one or more nodes of computer system 2200 that are distinct from those nodes implementing other elements.

In various embodiments, computer system 2200 may be a uniprocessor system including one processor 1210, or a multiprocessor system including several processors 1210 (e.g., two, four, eight, or another suitable number). Processors 1210 may be any suitable processor capable of executing instructions. For example, in various embodiments processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store program instructions 1222 and/or data 1232 accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing a fulfillment coordination service, such as fulfillment coordination service 100 described above, are shown stored within system memory 1220 as fulfillment coordination service 1224. In other embodiments, program instructions and/or data may be received, sent or stored upon different types of computer-accessible media or on similar media separate from system memory 1220 or computer system 2200. Generally speaking, a computer-accessible medium may include storage media or memory media such as magnetic or optical media, e.g., disk or CD/DVD-ROM coupled to computer system 2200 via I/O interface 1230. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1240.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 2200 and other devices attached to a network, such as other computer systems (e.g., the various computer system of FIGS. 1-6), or between nodes of computer system 2200. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or accessing data by one or more computer systems 1200. Multiple input/output devices 1250 may be present in computer system 2200 or may be distributed on various nodes of computer system 2200. In some embodiments, similar input/output devices may be separate from computer system 2200 and may interact with one or more nodes of computer system 2200 through a wired or wireless connection, such as over network interface 1240.

Figure 12:
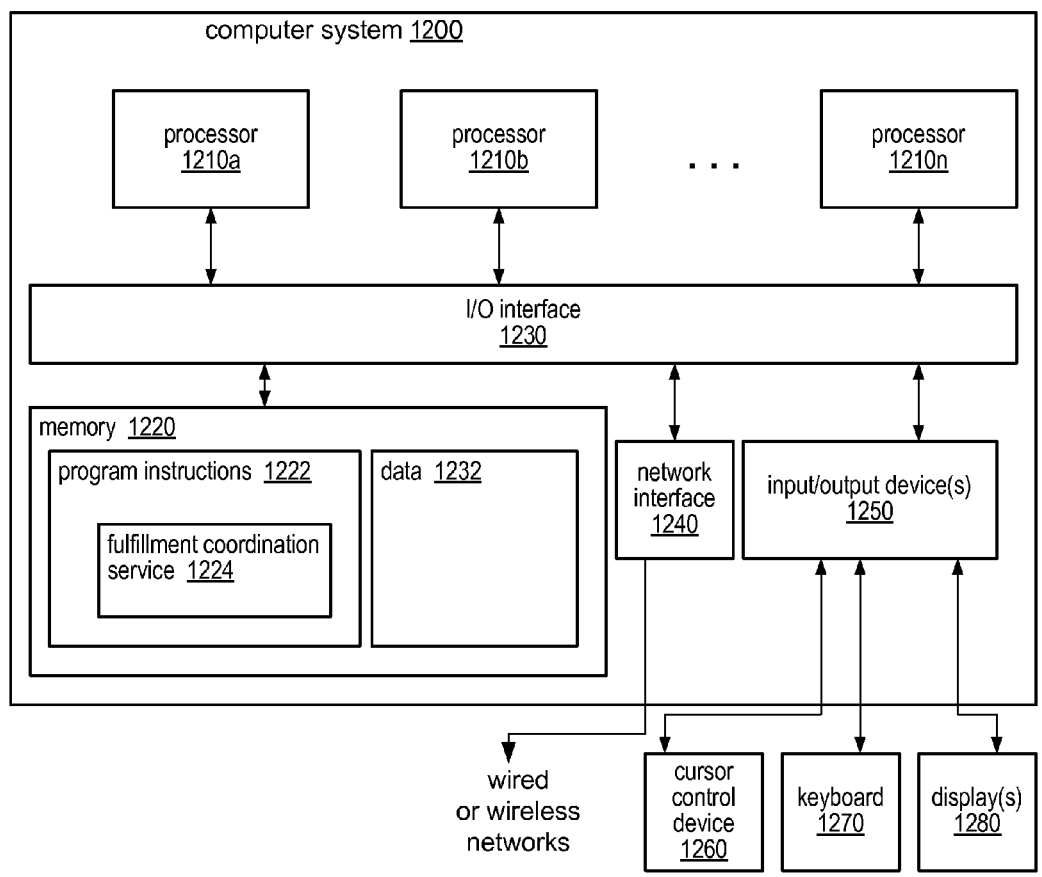
FIG. 12 illustrates a computing system suitable for implementing elements of a system and method for managing sales and fulfillment services, according to various embodiment.

As shown in FIG. 12, memory 1220 may include program instructions 1222 configured to implement a fulfillment coordination service, as illustrated by fulfillment coordination service 1224. In one embodiment, fulfillment coordination service 1224 may implement the methods described above, such as the methods illustrated by FIGS. 6-9. In other embodiments, different elements and data may be included.

Those skilled in the art will appreciate that computer system 2200 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 2200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2200 may be transmitted to computer system 2200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, various embodiments may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the steps of the methods may be changed, and various elements may be added, reordered, combined, omitted, modified, etc. Various modifications and changes may be made as would be obvious to a person skilled in the art having the benefit of this disclosure.

These various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A computer-implement method, comprising:
performing, by one or more computers:
receiving, by a fulfillment coordination service, a selection of one or more items of a merchant, wherein the one or more items are registered for fulfillment service with a fulfillment service provider;
generating, by the fulfillment coordination service, a sales listing for each selected item;
sending each generated sales listing from the fulfillment coordination service to a sales listing provider, wherein the sales listing provider hosts each generated sales listing and is a different entity from the fulfillment service provider;
receiving, by the fulfillment coordination service, an order indication for one or more of the selected items listed on said sales listing; and
sending, by the fulfillment coordination service, a fulfillment request to the fulfillment service provider for the one or more items indicated by said order indication.

2. The method of claim 1,
wherein the fulfillment coordination service is a different entity from the sales listing provider, and
wherein receiving said order indication comprises communicating with the sales listing provider through an application programming interface to receive said order indication from said sales listing provider.

3. The method of claim 1, further comprising:
requesting, by the fulfillment coordination service, the order indication from the sales listing provider, wherein said receiving the order indication occurs subsequent to said requesting the order indication from the sales listing provider.

4. The method of claim 1, wherein receiving said order indication comprises receiving said indication from a payment service provider.

5. The method of claim 4, further comprising, in response to receiving said order indication, querying, by the fulfillment coordination service, said sales listing provider for additional information.

6. The method of claim 5, wherein said additional information comprises one or more of: a quantity of said particular item, a shipping preference for shipping said particular item, and a delivery address to which the particular item is to be shipped.

7. The method of claim 5, wherein said fulfillment request is generated from said additional information.

8. The method of claim 1, wherein generating said sales listing comprises generating said sales listing from item description information indicating one or more characteristics of each selected item.

9. The method of claim 8, wherein said item description information specifies one or more of: a price for each selected item, dimensions for each selected item, weights for each selected item, a text-based description for each selected item, and an image for each selected item.

10. The method of claim 8, wherein said item description information comprises information from a database controlled by the fulfillment service provider.

11. The method of claim 1, further comprising:
prior to said generating the sales listing, receiving, by the fulfillment coordination service, account information from a user,
wherein the account information is for accessing an account for the user with the sales listing provider, and
wherein the fulfillment coordination service is a different entity from the sales listing provider; and
creating said sales listing at the sales listing provider using the account information to access the sales listing provider.

12. The method of claim 1, further comprising, in response to the fulfillment request, initiating shipment of one or more items specified by the fulfillment request.

13. A system, comprising;
a memory storing program instructions; and
one or more processors coupled to said memory, wherein said program instructions are executable by at least one of said one or more processors to implement a fulfillment coordination service configured to:
receive a selection of one or more items of a merchant, wherein the one or more items are registered for fulfillment service with a fulfillment service provider;
generate a sales listing for each selected item;
send each generated sales listing from the fulfillment coordination service to a sales listing provider, wherein the sales listing provider hosts each generated sales listing and is a different entity from the fulfillment service provider;
receive an order indication for one or more of the selected items listed on said sales listing; and
send a fulfillment request to the fulfillment service provider for the one or more items indicated by said order indication.

14. The system of claim 13, wherein to receive said order indication the fulfillment coordination service is configured to receive said order indication from said sales listing provider.

15. The system of claim 13, further comprising:
requesting the order indication from the sales listing provider,
wherein the fulfillment coordination service is configured to receive said order indication subsequent to said requesting the order indication from the sales listing provider.

16. The system of claim 13, wherein to receive said order indication the fulfillment coordination service is configured to receive said indication from a payment service provider.

17. The system of claim 16, wherein the fulfillment coordination service is further configured to, in response to receiving said order indication, query said sales listing provider for additional information.

18. The system of claim 17, wherein said additional information comprises one or more of: a quantity of said particular item, a shipping preference for shipping said particular item, and a delivery address to which the particular item is to be shipped.

19. The system of claim 17, wherein said fulfillment request is generated from said additional information.

20. The system of claim 13, wherein to generate said sales listing the fulfillment coordination service is configured to generate said sales listing from item description information indicating one or more characteristics of each selected item.

21. The system of claim 20, wherein said item description information specifies one or more of: a price for each selected item, dimensions for each selected item, weights for each selected item, a text-based description for each selected item, and an image for each selected item.

22. The system of claim 20, wherein said item description information comprises information from a database controlled by the fulfillment service provider.

23. The system of claim 13, wherein to generate said sales listing the fulfillment coordination service is configured to generate an auction-based sales listing configured to receive bids for at least one the selected items.

24. A non-transitory computer-readable storage medium, comprising program instructions configured to implement a fulfillment coordination service configured to:
   receive a selection of one or more items of a merchant, wherein the one or more items are registered for fulfillment service with a fulfillment service provider;
   generate a sales listing for each selected item;
   send each generated sales listing from the fulfillment coordination service to a sales listing provider, wherein the sales listing provider hosts each generated sales listing and is a different entity from the fulfillment service provider;
   receive an order indication for one or more of the selected items listed on said sales listing; and
   send a fulfillment request to the fulfillment service provider for the one or more items indicated by said order indication.

25. The non-transitory computer-readable storage medium of claim 24, wherein to receive said order indication the fulfillment coordination service is configured to receive said order indication from said sales listing provider.

26. The non-transitory computer-readable storage medium of claim 24, further comprising:
   requesting the order indication from the sales listing provider,
      wherein the fulfillment coordination service is configured to receive said order indication subsequent to said requesting the order indication from the sales listing provider.

27. The non-transitory computer-readable storage medium of claim 24, wherein to receive said order indication the fulfillment coordination service is configured to receive said indication from a payment service provider.

28. The non-transitory computer-readable storage medium of claim 27, wherein the fulfillment coordination service is further configured to, in response to receiving said order indication, query said sales listing provider for additional information.

29. The non-transitory computer-readable storage medium of claim 28, wherein said additional information comprises one or more of: a quantity of said particular item, a shipping preference for shipping said particular item, and a delivery address to which the particular item is to be shipped.

30. The non-transitory computer-readable storage medium of claim 28, wherein said fulfillment request is generated from said additional information.

31. The non-transitory computer-readable storage medium of claim 24, wherein to generate said sales listing the fulfillment coordination service is configured to generate said sales listing from item description information indicating one or more characteristics of each selected item.

32. The non-transitory computer-readable storage medium of claim 31, wherein said item description information specifies one or more of: a price for each selected item, dimensions for each selected item, weights for each selected item, a text-based description for each selected item, and an image for each selected item.

33. The non-transitory computer-readable storage medium of claim 31, wherein said item description information comprises information from a database controlled by the fulfillment service provider.

* * * * *